United States Patent [19]

Itoh et al.

[11] Patent Number: 5,060,005
[45] Date of Patent: Oct. 22, 1991

[54] CAMERA SYSTEM

[75] Inventors: Junichi Itoh; Yoshinori Matsuzawa, both of Hachioji; Youji Watanabe, Sagamihara; Yoshiaki Kobayashi, Nagano, all of Japan

[73] Assignee: Olympus Optical Co., Ltd., Japan

[21] Appl. No.: 437,983

[22] Filed: Nov. 16, 1989

[30] Foreign Application Priority Data

Nov. 17, 1988 [JP] Japan .................. 63-292065

[51] Int. Cl.$^5$ ................................. G03B 7/00
[52] U.S. Cl. ...................... 354/412; 354/286
[58] Field of Search .................. 354/412, 286

[56] References Cited

U.S. PATENT DOCUMENTS

| | | | |
|---|---|---|---|
| 4,737,812 | 4/1988 | Hasegawa et al. | 354/286 |
| 4,743,931 | 5/1988 | Matsuzaki et al. | 354/286 |
| 4,769,665 | 9/1988 | Dagborn | 354/412 |
| 4,782,355 | 11/1988 | Sakai et al. | 354/412 |
| 4,816,858 | 3/1989 | Watanabe et al. | 354/400 |
| 4,841,327 | 6/1989 | Yamamoto et al. | 354/412 |
| 4,853,733 | 8/1989 | Watanabe et al. | 354/412 |
| 4,873,543 | 10/1989 | Matsuzaki et al. | 354/402 |
| 4,912,494 | 5/1990 | Tanaka et al. | 354/286 |
| 4,922,283 | 5/1990 | Fukui | 354/286 |

FOREIGN PATENT DOCUMENTS 0229237 10/1987 Japan .

Primary Examiner—Russell E. Adams
Attorney, Agent, or Firm—Louis Weinstein

[57] ABSTRACT

A camera system includes a camera body and a camera accessory which may be mounted on the camera body and executes predetermined operations in accordance with instructions from the camera body when the accessory is mounted on the camera body. The camera system comprises circuitry for outputting a control signal to the accessory for bringing the accessory into an operative state prior to a predetermined camera operation, circuitry responsive to the control signal for activating the camera accessory from an inoperative state to an operative state, circuitry for providing a signal to instruct an operation mode to the accessory from the camera body after the accessory has been activated into an operative state, circuitry for executing the operation mode in the accessory in accordance with the operation mode instructing signal, and circuitry for returning the accessory from an operative state to an inoperative state after the execution of the operation mode.

36 Claims, 12 Drawing Sheets

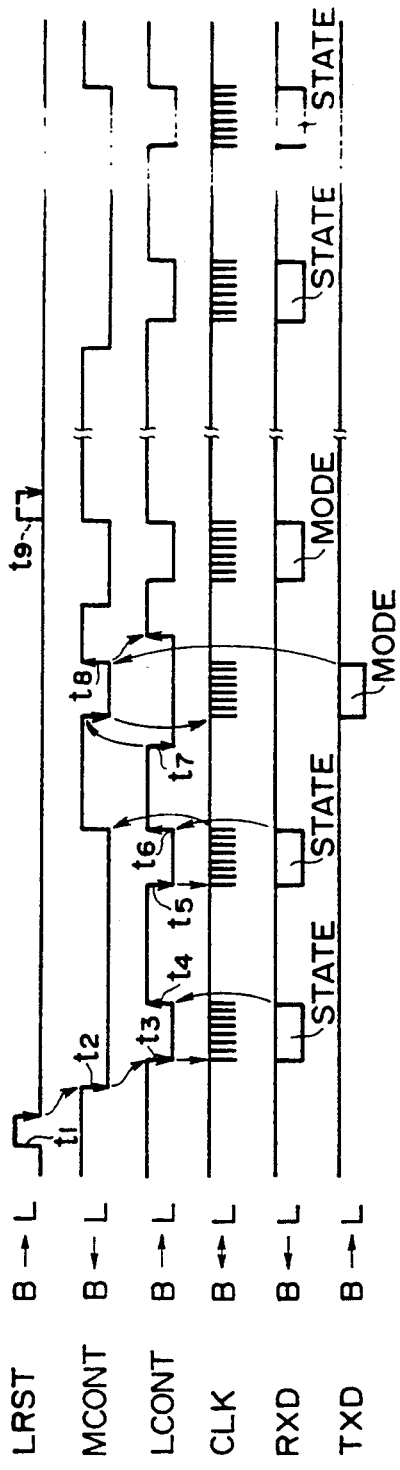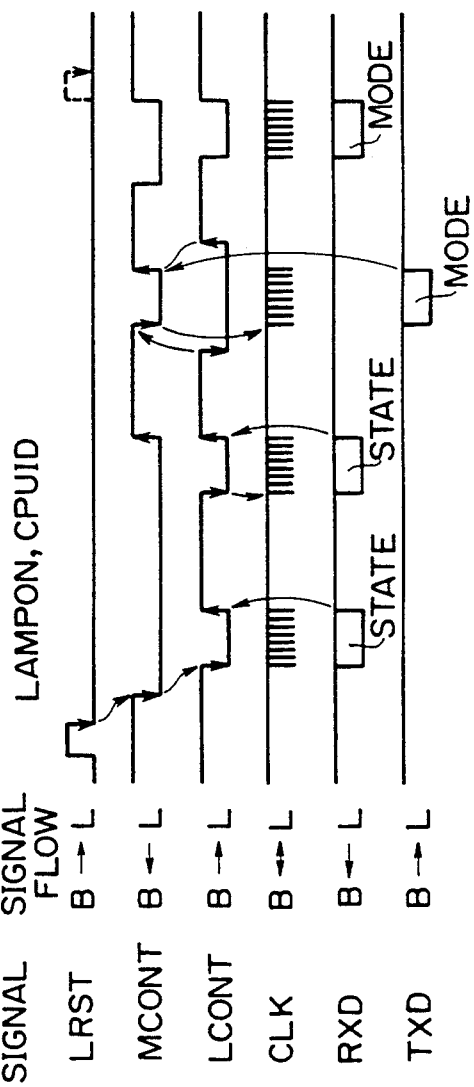

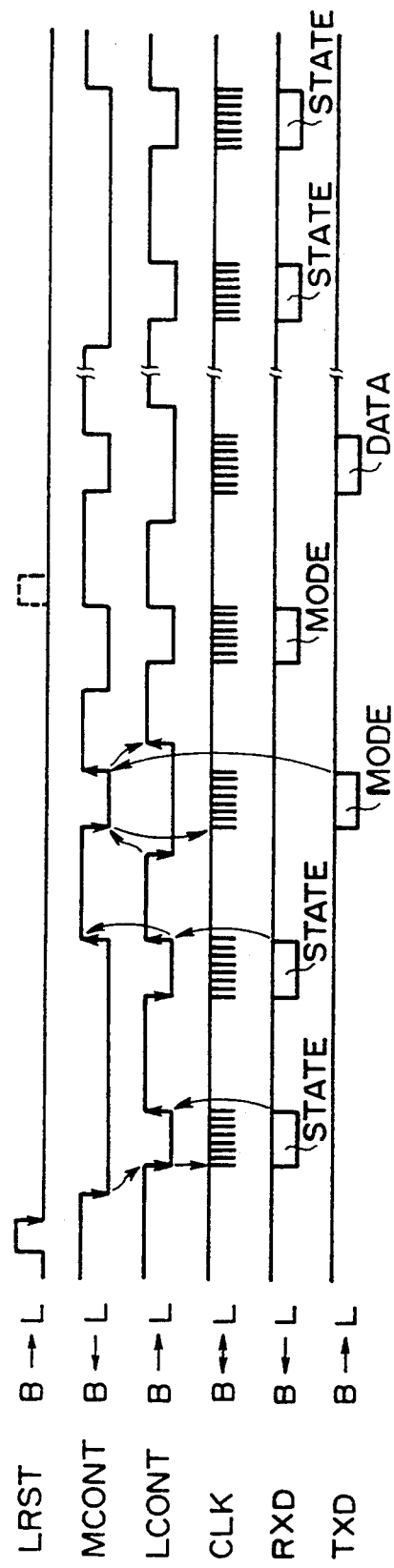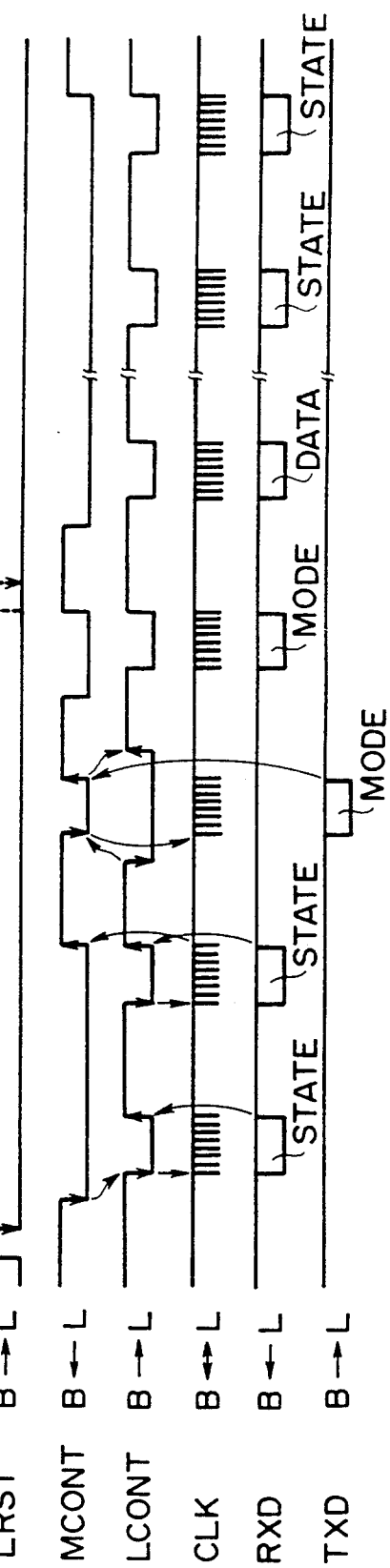

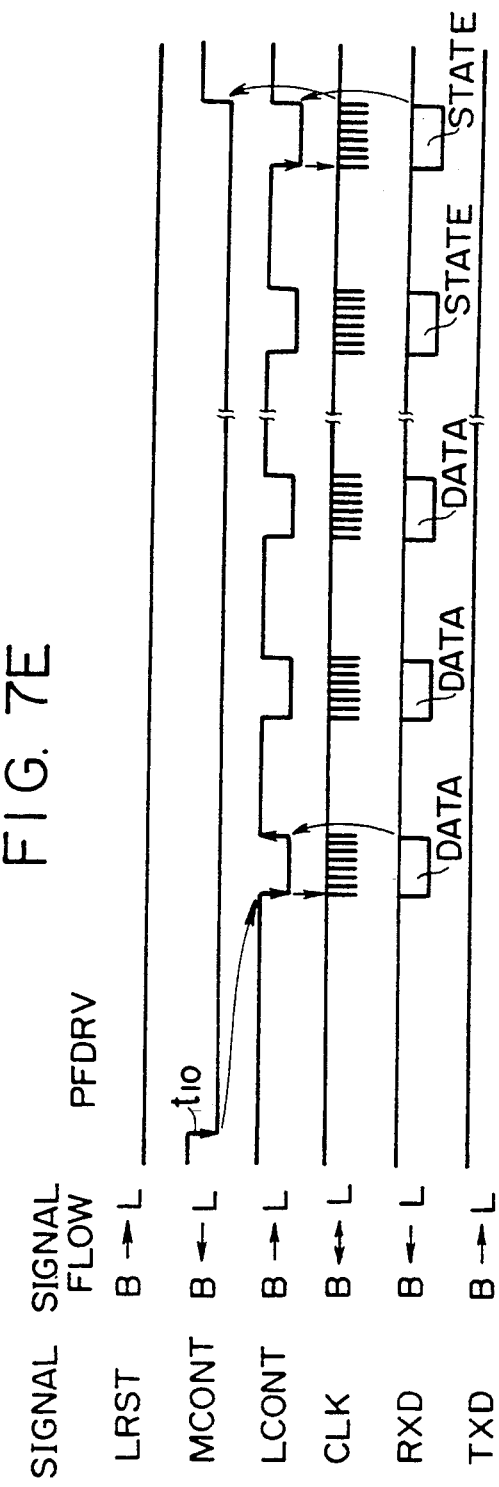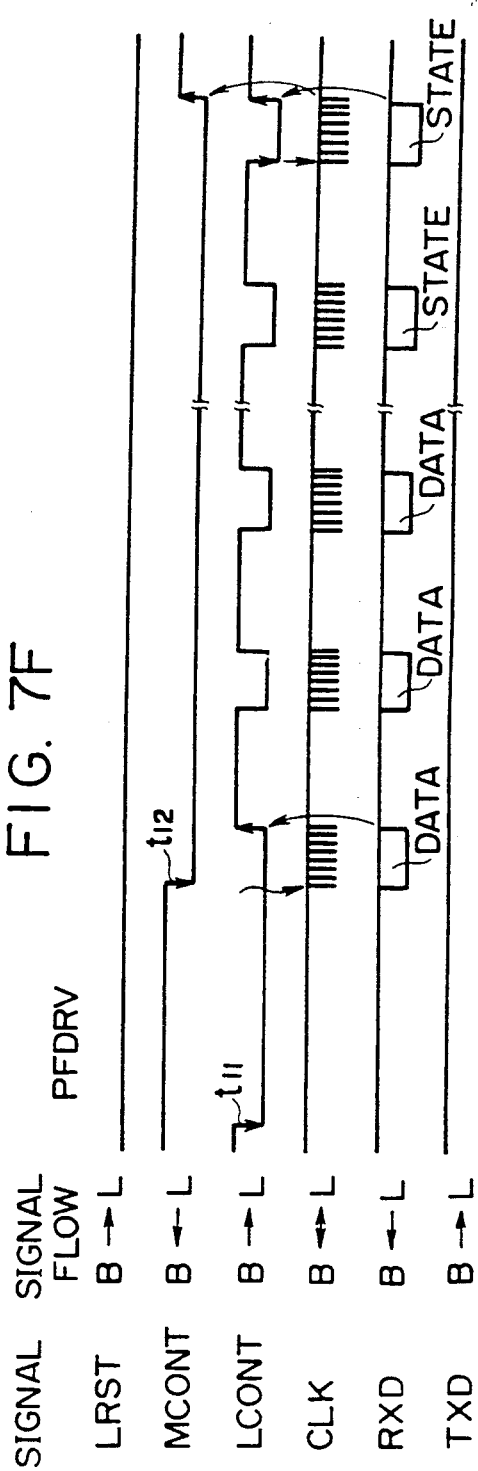

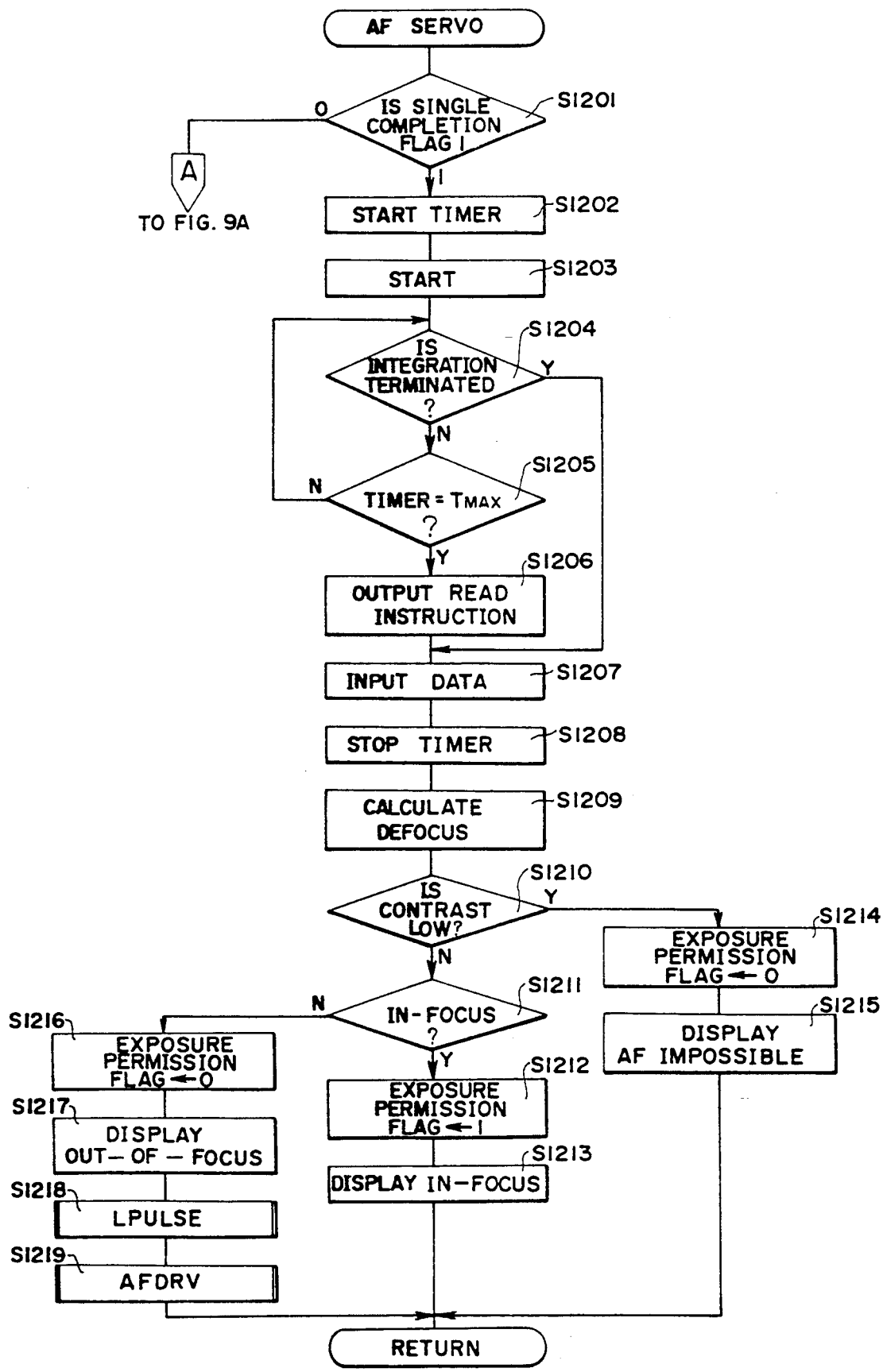

CAMERA SYSTEM

FIELD OF THE INVENTION

The present invention relates to a camera system and in particular to a camera system in which a camera body and a camera accessory such as exchangeable lens barrel and electronic flash which is selectively mounted on the camera body, execute various camera operations in cooperation with each other by means of microcomputers.

BACKGROUND OF THE INVENTION

Functions of camera accessories have recently become more complicated with an advance in camera function. A microcomputer has heretofore been used in only a camera body, but it is at present used in accessories to execute various camera operations in cooperation with a microcomputer in a camera body. In this case, operations in the accessory are executed in response to control signals transmitted from the microcomputer in the camera body via electric contacts connected with each other on mounting of the accessory (refer to Japanese Laid-Open Patent Application Sho 62-229237). In most cases, power for circuits for the accessory is supplied from the camera body via similar contacts.

A problem resides in the reliability of control and communication signals and power supply lines. These lines connect a camera body and an accessory via electric contacts and are designed to provide a high reliability so that no problem occurs on normal use. However there are fears that the microcomputer in the accessory malfunctions due to supply of insufficient power to the accessory and that a program will run away due to pick-up of noises during communication.

Another problem resides in power consumption. When camera operation is executed, power as much as double of that consumed in a conventional camera is consumed since circuits in both the camera body and camera accessory work simultaneously. Since less operations are executed in the accessory than those in the camera body, the microcomputer in the accessory is on stands by for a longer time from the completion of a given operation to the next operation. During this standby period, the circuits in the accessory continues to consume some electric power, resulting in waste of power.

SUMMARY OF THE INVENTION

It is an object of the present invention to provide a camera system which overcomes the afore-mentioned disadvantages.

It is another object of the present invention to provide a camera system in which microcomputers do not malfunction and the program will not run away.

It is a further object of the present invention to provide a camera system which consumes less power.

A camera system of the present invention comprises a camera body and a camera accessory which may be mounted on the camera body and is adapted to execute predetermined operations in accordance with instructions from the camera body as shown in FIG. 1.

The camera body is adapted to execute predetermined camera operations in cooperation with the camera accessory. The camera body includes a microcomputer which executes a program including a first step of outputting a control signal which renders the camera accessory operative and a second step of outputting a control instruction which instructs the camera accessory to execute one of a plurality of operation modes programmed in the accessory.

The camera accessory includes a microcomputer which executes a program including a first step for activating the accessory from an inoperative state for saving energy to an operative state in response to a control instruction from the camera body; a second step for selecting one of a plurality of operation modes which function independently of each other; a third step for executing the selected operation mode and a fourth step for returning the accessory to the inoperative state again after the execution of the third step.

The microcomputer 1 in the camera body is coupled with the microcomputer 2 in the accessory through a control signal line 3, a communication signal line 4 and a connecting means 5.

BRIEF DESCRIPTION OF THE DRAWINGS

FIGS. 7A through 7F are flow charts showing the flow of control signals between a microcomputer in an accessory and a microcomputer in a camera body shown in FIG. 2; FIG. 7A being a flow chart showing the signal flow in operation modes "AFDRV", "LRESET", "LSCAN", "PFDRV" and "AVRST"; FIG. 7B being a flow chart showing the signal flow in operation modes "LAMPON" and "CPUID"; FIG. 7C being a flow chart showing the signal flow in operation modes "LPULSE", "PLSSET", "ABSSET", "LAMPSET", and "aVSET"; FIG. 7D being a flow chart showing the signal flow in operation modes "LTDATA" and "AEAFDATA"; FIG. 7E being a flow chart showing the signal flow in an operation mode "PFDRV"; FIG. 7F being a flow chart showing the signal flow in an operation mode "PFDRV";

FIGS. 8 through 11 are flow charts showing the operation executed in the microcomputer in the camera body; FIG. 8 showing a main program; FIGS. 9A to 11 showing subrouting programs of "AF single", "AF servo" and "Manual", respectively.

DETAILED DESCRIPTION OF THE EMBODIMENTS

The present invention will be described with reference to drawings.

Figure 2:
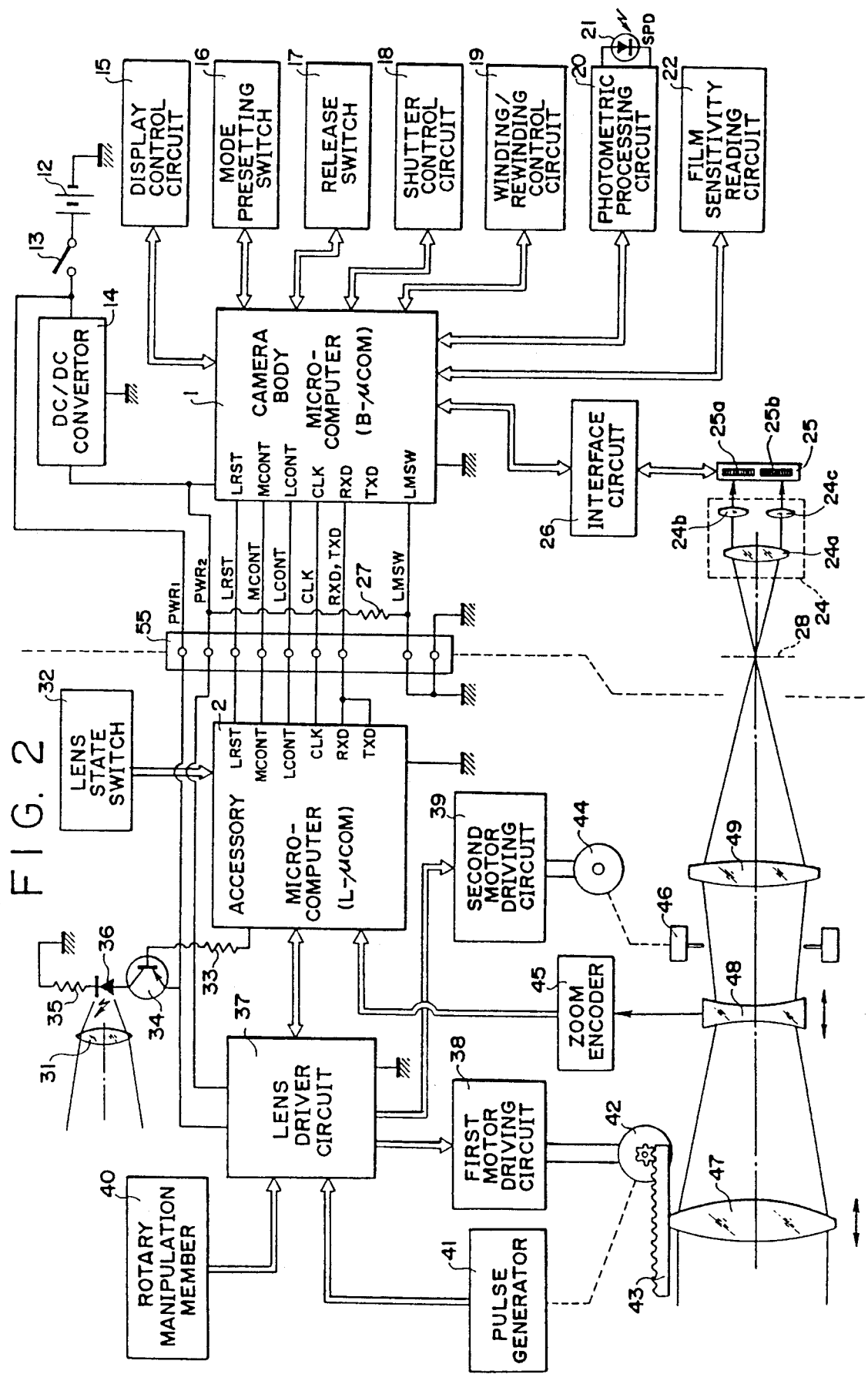
FIG. 2 is a block diagram showing an embodiment of the present invention in which a lens barrel is used as an accessory.

Referring now to FIG. 2, there is shown an embodiment of a camera system of the present invention in which an interchangeable lens barrel is used as a camera accessory.

Figure 1:
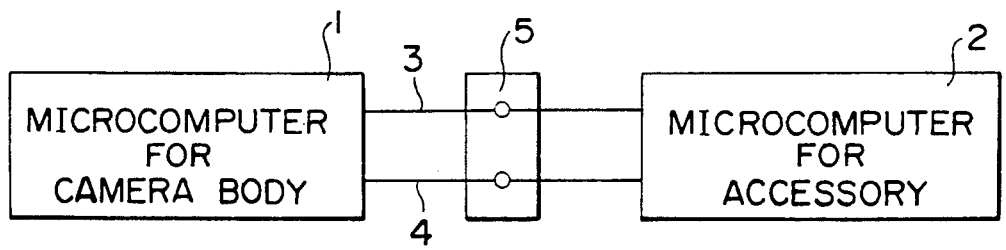
FIG. 1 is a schematic view for explaining the present invention.
Figure 3:
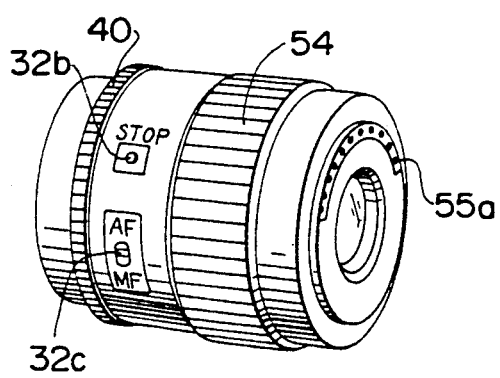
FIGS. 3A and 3B are perspective views showing a lens barrel and a camera body of the camera system shown in FIG. 2, respectively.
Figure 3:
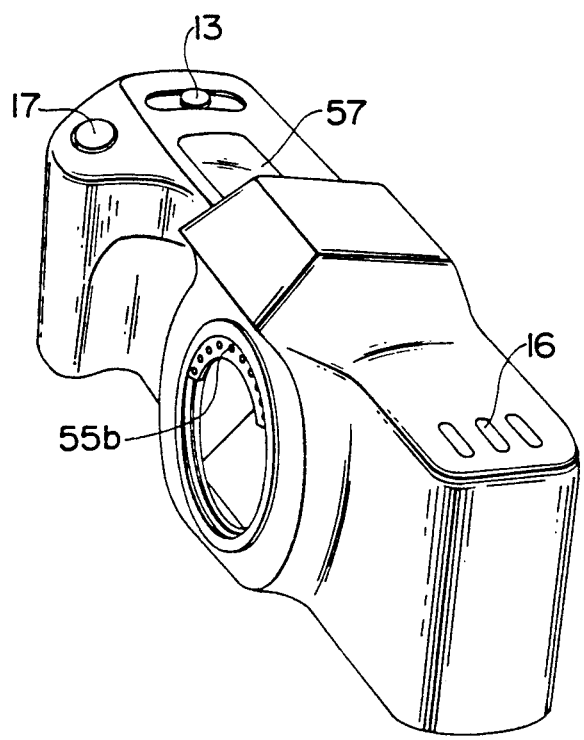

FIGS. 3A and 3B are perspective views showing an interchangeable lens barrel used as a camera accessory and a camera body, respectively.

The interchangeable lens barrel has a rotary manipulating member 40 and a zoom ring 54 on the outer periphery thereof. The barrel is provided at the rear end thereof with a bayonet mount which is removably mounted on the camera body. Mount contacts 55a which make electric connection with the camera body are disposed on the mount. Electric contacts 55b which make electric connection with the mount contacts 55a are also disposed on the lens mount of the camera body.

As shown in FIG. 2, a picture taking optical system comprising a focussing lens 47, zoom lenses 48 and 49 is designed to be driven through a rack mechanism 43 by means of d.c. motor 42. Movement of the zoom lens 48 is detected by a zoom encoder 45. An aperture mechanism 46 is driven by a stepping motor 44. Light from an object to be photographed which is transmitted through the taking optical system is split by a pupil splitting optical system 24 behind an expected focal plane 28 including a pupil projecting lens 24a and pupil splitting lenses 24b and 24c disposed behind the lens 24a and the splitted light is respectively incident upon a line sensor 25 including A and B group sensors 25a and 25b.

The line sensor 25 comprises a plurality of SIPTs (static induction type phototransistors) which are disposed in a rectilinear manner. A signal which has been photoelectrically converted by the SIPTs is applied to a microcomputer (hereinafter referred to as "B-$\mu$COM") in the camera body through an interface circuit 26.

The voltage of the power source battery 12 is supplied to respective circuits by turning a main switch 13 on. The voltage which has been regulated by a DC/DC converter 14 is supplied to microcomputers and control circuits which require a constant voltage. The B-$\mu$COM 1 executes a sequence control of the whole system and various operations and is adapted to control a microprocessor at the accessory side (hereinafter referred to as "L-$\mu$COM") 2 via a control line of the mount contact 55.

A display control circuit 15 controls the display of various modes, film frame number or exposure information (AF state) (not shown in FIG. 3) in a viewfinder in accordance with the instruction from the B-$\mu$COM 1.

A mode presetting switch 16 is used for presetting an exposure mode, AF operation mode, and for presetting a TV value in a manual exposure mode.

A release switch 17 is a two step depression switch. B-$\mu$COM 1 executes AF and photometry in response to a first signal generated when the switch 17 is half depressed and executes an exposure operation in response to a second signal generated when the switch 17 is fully depressed.

A shutter control circuit 18 establishes a shutter second time Tv based upon a shutter second time signal from B-$\mu$COM and controls moving up and down of a quick return mirror (not shown) as well as first and second screens of a focal-plane shutter (not shown) based upon the Tv value.

A film winding and rewinding control circuit 19 controls winding and rewinding of a film in response to an instruction from B-$\mu$COM 1.

A photometric processing circuit 20 detects a brightness of an object to be photographed from a photocurrent of a photometric sensor such as SPD (silicon photodiode) 21 so that it provides a signal representative of an object brightness Bv to the B-$\mu$COM 1.

A film sensitivity reading circuit 22 reads DX code of a film so that it provides a signal representative of a film sensitivity information Sv to the B-$\mu$COM.

A light flux of an exit pupil of the taking lens is split by a pupil splitting optical system 24 and is imaged upon the A group sensor 25a and the B group sensor 25b of the line sensor 25 comprising SIPTs (static induction type phototransistors) which are arranged along a line.

An interface circuit 26 comprises a line sensor control circuit and an A/D converter. When the interface circuit 26 receives a control signal from B-$\mu$COM 1, the line sensor control circuit is operated to integrate a signal output from the line sensor 25. When the integrated signal reaches a suitable level, the integrated output is converted into a digital value by the A/D converter and is supplied to B-$\mu$COM 1 so that the B-$\mu$COM 1 computes the defocus amount based on the digital value.

Mount contacts 55 connect circuits in the camera body with the circuits in the lens. Power supply to the lens and communication between L-$\mu$COM and B-$\mu$COM is carried out through the contacts 55. Signals for communication will be described hereafter.

Now the lens barrel will be described. L-$\mu$COM 2 executes lens driving, aperture driving and various operations in response to instructions from the B-$\mu$COM 1. A lens state switch 32 comprises AV$_0$ switch, STOP switch and AM switch. AV$_0$ switch (not shown) detects the opening of the aperture and is normally turned on when the aperture is closed and is turned off when the aperture is opened. STOP switch 32b is provided upon the outer periphery of the lens barrel as shown in FIG. 3(A). The STOP switch is used when a user desires to execute exposure operation irrespective of AF state. If the STOP switch 32b is turned on, the lens driving would be interrupted. If the release switch is fully depressed, exposure operation would be immediately carried out. AM switch 32c is disposed adjacent to the STOP switch 32b on the outer periphery of the lens barrel as shown in FIG. 3(A). When the switch is shifted to the upper AF side, "AF single" or "AF servo" mode is executed. When the switch is shifted to the lower MF side, power focussing is carried out in which L-$\mu$COM 2 controls the driving amount of the lens in response to the amount of rotation of the rotary manipulation member 40.

Referring to FIG. 2 again, an auxiliary light projection circuit comprises resistors 33 and 35, a transistor 34, an LED 36 and a condensor lens 31. The light projection circuit is used to project light upon the object to increase the object brightness by causing the high brightness LED 36 to emit light when the object brightness is low. A lens driver circuit 37 establishes a signal to operate first and second motor driving circuits 38 and 39 in response to the instruction from the L-$\mu$COM 2 and processes signals from the rotary manipulation member 40 and a pulse generator 41 using a photointerrupter for providing the processed signals to the L-μCOM 2.

Figure 4:
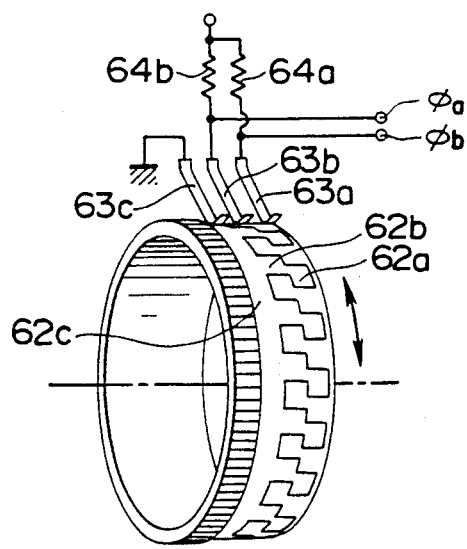
FIG. 4A is a perspective view showing a main part of a signal forming part of a rotary manipulation member shown in FIG. 2.
FIG. 4(B) is a view showing waveforms of two phase pulse signals obtained by the signal forming part.
Figure 4:
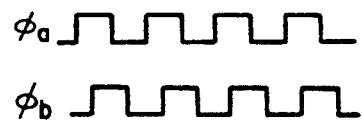

The rotary manipulation member 40 functions as a focussing ring and is formed as shown in FIG. 4(A). That is, the member comprises conductive patterns 62a, 62b and 62c disposed in a mosaic manner and contacts 63a, 63b and 63c which are pressure contacted with the patterns 62a, 62b and 62c, respectively. The contacts 63a and 63b are connected with a power source terminal through pull-up resistors 64a and 64b respectively. The contact 63c is connected to a ground terminal. In the thus formed rotary manipulation member 40, when the contacts 63a and 63b are short circuited by the contact 63c through the conductive patterns 62a, 62b and 62c responsive to the rotation of the barrel, the output terminals $\phi_a$, $\phi_b$ are rendered "L" level and when the contacts 63a and 63b are opened, the terminals $\phi_a$ and $\phi_b$ are rendered "H" level. Accordingly, assuming the signals from the terminals $\phi_a$ and $\phi_b$ are identical as same references $\phi_a$ and $\phi_b$, two phase clock pulses $\phi_a$ and $\phi_b$ are outputted in response to the rotation of the manipulation member. The output signals are converted into signals representative of rotation direction and rotation speed by the lens driver circuit 37 and then the latter signals are applied to the L-μCOM 2.

Figure 5:
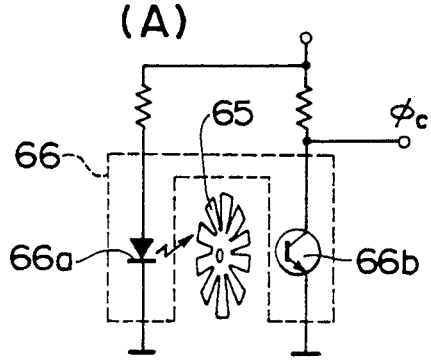
FIG. 5A is a view showing a main part of a pulse generating part of a pulse generator shown in FIG. 2.
FIG. 5B is a waveform view showing the output from the pulse generating part.
Figure 5:
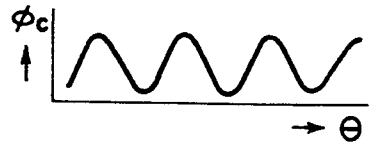
Figure 6:
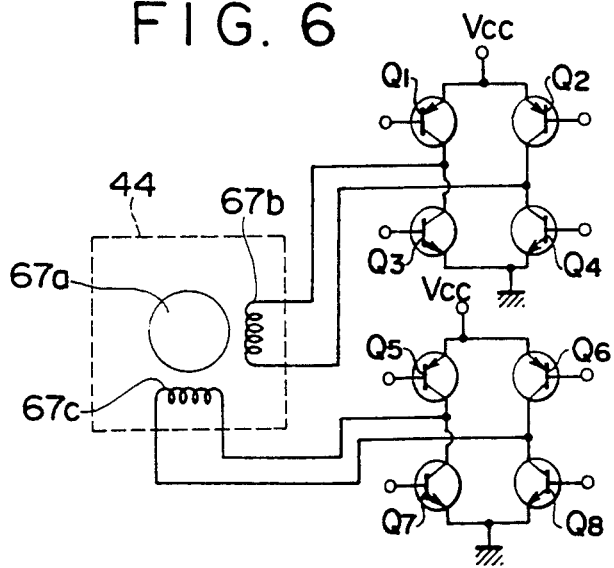
FIG. 6 is a circuit diagram showing a main part of a driving circuit for pulse driving a stepping motor shown in FIG. 2.

A pulse generator 41 generates pulses in proportion to the rotation of a D.C. motor 42 for driving a focal point adjusting lens 47. Such a pulse generator 41 includes a wheel 65 in which equally spaced slits are provided as shown in FIG. 5(A). When the wheel 65 is rotated in response to the rotation of the motor 42, a photointerrupter 66 including a light emitting portion 66a and a light receiving portion 66b, arranged so that the wheel 65 is located between portions 66a and 66b, counts the slits of the wheels 65. As a result, output signals $\phi_c$ are obtained from a collector of the light receiving portion 66b. After the outputs $\phi_c$ have been shape-formed by the lens driver 37, then they are fed to the L-μCOM 2. A first motor driving circuit 38 comprises a transistor bridge circuit and is adapted to drive the D.C. motor 42. The zoom encoder 45 outputs codes corresponding to the position of the zoom lens 48, that is, a value representative of a current focal length of the zoom lens. A second motor driving circuit 39 drives a stepping motor 44 for driving an aperture mechanism 46. Assuming a two-phase stepping motor is used, the driving circuit comprises two bridge circuits including transistors as shown in FIG. 6 for normally or reversely rotating the motor 44 and drives the stepping motor in response to the signal from the lens driver circuit.

A static winding 67b of the stepping motor 44 is energized by a bridge circuit comprising transistors $Q_1$ through $Q_4$ while a static winding 67c is energized by a bridge circuit comprising transistors $Q_5$ through $Q_8$ Each bridge circuit is driven so that diagonally opposing two elements, for example, the transistors $Q_1$ and $Q_4$ are turned on while the transistors $Q_2$ and $Q_3$ are turned off and vice versa. This causes a rotor 67a of the stepping motor 44 to be rotated.

Signal lines to the mount contacts 55 (55a and 55b) will be described. Power supply lines $PWR_1$, $PWR_2$ for supplying power to lens circuits from the camera main body, and communication signal lines for communicating B-μCOM 1 with L-μCOM 2 are connected to the mount contacts 55 (55a and 55b). A signal line LRST feeds a reset signal from the B-μCOM 1 to the L-μCOM 2. Signal lines MCONT and LCONT are handshake lines used for synchronization of communication between B-μCOM 1 and L-μCOM 2. A signal line CLK feeds a synchronization clock used for synchronization of data in serial communication.

A signal line RXD and TXD, which is a single line, feeds serial data in synchronization with the output of clock signal CLK. For example, when data are transmitted from B-μCOM 1 to L-μCOM 2, data are outputted from TXD of B-μCOM 1 and are inputted to RXD of L-μCOM 2. A signal line LMSW is used for determining whether a lens used as an accessory is mounted upon a camera body. The line LMSW is connected with the power supply line via the pull-up resistor 27 and is grounded at the lens side through the mount contact 55. Accordingly, when the lens barrel is mounted upon the camera body, the signal line LMSW is at a logical "L" level. When the barrel is not mounted upon the camera body, the line LMSW is at an "H" level so that whether or not the barrel is mounted upon the camera body may be detected at the camera body side by reading the logical level of the signal line LMSW at B-μCOM 1.

TABLE 1

| mode | code | the number of data communicated from L-μCOM to B-μCOM | the number of data communicated from B-μCOM to L-μCOM |
|---|---|---|---|
| LPULSE | 10H | — | 2 bytes |
| PLSSET | 11H | — | 2 bytes |
| ABSSET | 12H | — | 2 bytes |
| LAMPSET | 13H | — | — |
| AFDRV | 20H | — | — |
| LRESET | 21H | — | — |
| LSCAN | 22H | — | — |
| PFDRV | 23H | 14 bytes | — |
| AVRST | 30H | — | — |
| AVSET | 31H | — | 2 bytes |
| LAMPON | 40H | — | — |
| LTDATA | 50H | 4 bytes | — |
| AEAFDATA | 51H | 14 bytes | — |
| CPUID | 60H | — | — |

Summary of Operation Modes of L-μCOM 2 will be described with reference to Table 1 prior to description of the program of B-μCOM 1.

LPULSE: The code is 10H. The code means data outputted from B-μCOM 1 used when L-μCOM 2 selects each operation mode. In this mode, LμCOM 2 receives 2 byte data representative of a defocus amount and defocus direction from B-μCOM 1 and uses an optimum AF coefficient to compute a driving pulse number representative of lens movement amount and driving direction and sets them into a register.

PLSSET: The code is 11H. L-μCOM 2 receives 2 byte data represntative of the number of driving pulses and driving direction from B-μCOM 1 to set it into a register.

ABSSET: The code is 12H. L-μCOM 2 receives 2 byte data representative of absolute distance data from B-μCOM 1, and computes the number of driving pulses required for a current position to move it to a requested position and a driving direction to set them in a register.

LAMPSET: The code is 13H. The number of driving pulses from a current position to an auxiliary light standard position and the driving direction is computed to be reset into a register. The auxiliary light standard position is defined as a lens position at which the effect of the auxiliary light becomes maximum taking into consideration, an effective distance of the auxiliary light, a focal length of the lens and maximum defocus amount, etc.

AFDRV: The code is 20H. The lens is driven in accordance with the number of driving pulses and the driving direction stored in the register. It is necessary that the content in the register has already been set in the above four modes.

LRESET: The code is 21H. The lens is forcedly moved to a standard position (an infinity stop). This mode is executed when the lens is mounted or when the power of L-μCOM 2 is turned on. After completion of the operation an absolute distance counter is reset. The absolute distance counter up and down-counts the pulses representative of the driving amounts of the lens driving motor, outputted from the pulse generator when the lens is moved out and in respectively. Therefore the data of the absolute distance counter represents a movement amount of a lens from an infinity position. An absolute distance data can be also calculated based upon such data.

LSCAN: The code is 22H. This mode is an operation for searching a high contrast position by moving the lens once from the current position through a proximate end to an infinity end when the contrast level of an object is too low to measure an object distance. After B-μCOM 1 instructs LSCAN to L-μCOM 2, it repeats integration operation of the AF sensor and contrast condition determination operation and instructs halting of the scanning operation to L-μCOM 2 when the object contrast exceeds a predetermined level.

10 PFDRV: The code is 23H. The rotation direction and rotational speed of the rotary manipulation member is detected and a driving signal responsive to them is provided to the lens driving motor for driving the lens. The mode is referred to as power focussing mode.

AVRST: The code is 30H. The stepping motor 44 is driven to drive the aperture 46 to an open position.

AVSET: The code is 31H. L-μCOM 2 receives 2 byte data representative of FNo from B-μCOM 1 and drives the aperture by a deviation from a current aperture value.

LAMPON: The code is 40H. The auxiliary light in the lens is lit.

LTDATA: The code is 50H. 4 byte data representative of lens inherent information are outputted to B-μCOM 1. Lens inherent information includes data related with lens control method indicating whether AF is possible, whether a teleconverter is usable, whether power focussing is possible, whether zooming is possible, etc. and identification code indicating lens production date and production No.

AEAFDATA: The code is 51H. Data for photometry and rangefinding which changes by the zooming and lens driving is outputted to B-μCOM 1. Such data includes an opening step representative of a decrease in the amount of light of the lens, which is generated in accordance with $\cos^4$ law of the lens, a coefficient compensating for change in diffusion amount of a focussing screen, generated by change in position of the exit of a pupil of the lens, an aperture value of the lens (maximum, minimum and current values), an absolute distance, a magnification of an object to be photographed, and an AF compensation data representative of a deviation between a position which an AF sensor presumes a focussed position and the best imaging position of the lens.

CPUID: The code is 60H. L-μCOM 2 is brought into an idle mode. This mode is used when the auxiliary light is turned off or when only state data representative of a lens state is necessary.

The state data will be described hereafter.

As mentioned above, operation modes of L-μCOM 2 are subdivided so that each one operation has a single function. Accordingly, the program of L-μCOM 2 is executed by calling a single function block in response to a transmitted code. This facilitates simplification of the program. Considering the program from the side for controlling L-μCOM 2, various uses are possible by the combination of any of the single functions. For example, combination of "LPULSE" mode with "AFDRV" mode makes it possible to execute only lens control on AF. However combination of "PLSSET" mode with "AFDRV" mode may be used when the lens is desired to be moved by a remote control. For example, if a remote control unit having a knob type manipulation member applies the pulses proportional to the amount of rotation of the knob upon L-μCOM 2 to execute "AFDRV" mode, operation commonly called power focussing would be possible by a remote control technique. Combination of "ABSSET" mode with "AFDRV" mode is effective when a lens is desired to be set to a given distance taking a depth-of-field into consideration for focussing more than one object located at different distances. A camera mode commonly called "focus preset" is made possible by combination of ABSSET with AFDRV. The position of a lens which is desired to be preset is stored based upon an absolute distance data of "AEAFDATA" mode. Combination of ABSSET with AFDRV modes is executed based upon the stored data when the lens is to be preset to the desired position.

Referring now to FIGS. 7A to 7F, there are shown timing charts for explaining the communication procedure between B-μCOM 1 and L-μCOM 2. In the drawings, the signal name is identical with the reference of a signal line which carries the same signal. Basic process of communication comprises steps of: feeding a state signal from L-μCOM 2 to B-μCOM 1, receiving from B-μCOM 1 a code signal representative of a mode which L-μCOM 2 executes by L-μCOM 2 for executing the corresponding operation, and feeding a state signal back to B-μCOM 1 after completion of the operation. The state signal is two byte data representative of a lens state and includes, for example, states of an AM switch, STOP switch, and Av$_0$ switch, and a state representing whether a lens is at an infinity end or a proximate end, whether abnormal situation occurs in a lens, whether a teleconverter, an intermediate ring etc. are mounted, whether a lens is located at a close focus area, etc.

Operation modes of L-μCOM 2 which operates in a timing as shown in FIG. 7(A) includes "AFDRV", "LRESET", "LSCAN", "PFDRV", and "AVRST". B-μCOM 1 outputs a reset pulse "LRST" on the communication line "LRST" at time $t_1$ prior to the communication. This signal "LRST" resets L-μCOM 2 so that it recovers to an operative state from an inoperative state. At the time $t_2$, L-μCOM 2 sets the logical level of the signal line "MCONT" from HI to LO to inform B-μCOM 1 that transmission is possible. If B-μCOM 1 is capable of receiving at the time $t_3$, the logical level of the signal line "LCONT" is set from HI to LO. The L-μCOM 2 which detects that the logical level of the signal line "LCONT" is LO, outputs one byte, that is an 8 bit synchronization clock signal from the signal line "CLK" and a first one byte of a state signal from "RXD" terminal. The B-μCOM 1 then receives a first one byte of data of state signal from "RXD" terminal in synchronization with clock signals. After data input, B-μCOM 1 sets the logical level of the signal line "LCONT" from LO to HI. After L-μCOM 2 confirms that the logical level of the signal line "LCONT" has been HI, it prepares to output a second byte of the state signal. After data processing of one byte state signal has been completed B-μCOM 1 operates the signal line "LCONT" to receive the second byte of the state signal from L-μCOM 2 at time $t_5$ as is similar to the first byte of the state signal. When the reception of the second byte of the state signal has been completed, L-μCOM 2 sets the logical level of the signal line "MCONT" from LO to HI after it continues that the logical level of the signal line "LCONT" becomes LO to HI. In such a manner communication of a series of state signals is completed.

Next, data representative of an operation mode must be fed from B-μCOM 1 to L-μCOM 2. B-μCOM 1 sets the logical level of the signal line "LCONT" from HI to LO at time $t_7$ to inform L-μCOM 2 that transmission is possible. L-μCOM 2 sets the logical level of the signal line "MCONT" if it is capable of receiving. B-μCOM 1, which detects that the signal line "MCONT" is LO, outputs synchronization clocks on the signal line CLK and data representative of operation mode from "TXD". L-μCOM 2 then receives data representative of operation mode via the signal line "TXD" in synchronization with the clock signal "CLK" and sets the logical level of the signal line "MCONT" at time $t_8$ after reception of data. B-μCOM 1 sets the logical level of the signal line "LCONT" from LO to HI after it confirms that the signal "MCONT" has become HI. Communication of data mode is completed.

Then communication is carried out for determining whether normal communication is conducted. That is, mode data which have been transmitted from B-μCOM 1 to L-μCOM 2 are transmitted back from L-μCOM 2 to B-μCOM 1. B-μCOM 1 determines whether both data are identical. Communication process of mode data is identical with communication process of state data except that data are one byte in the former process while data are two bytes in the latter process. B-μCOM 1 immediately outputs a reset pulse on the signal line "LRST" (shown in dotted line at time $t_9$ in FIG. 7) when the data returned from L-μCOM 2 are not identical with the transmitted data. Communication at this time is interrupted after B-μCOM 1 outputs such a reset pulse. In this case, although L-μCOM 2 is initialized by this reset signal at the time $t_9$ to start to communicate with B-μCOM 1, B-μCOM 1 can not handshake since it stops communication. Since L-μCOM 2 is programmed to return to an inoperative state when it can not handshake, no operation is performed. Although probability that such an abnormal state will occur in communication data is very low, such a processing program for safety is incorporated taking into consideration the fact that communication is carried out via an electric contact and an interference noise may be carried on the communication line.

L-μCOM 2 performs an operation corresponding to mode data if the communication is normal and no reset pulse is outputted at the time $t_9$ After completion of the operation corresponding to the mode data, L-μCOM 2 retransmits the state data to B-μCOM 1 as is similar to the afore-mentioned communication process of the state data. B-μCOM 1 receives this state data to detect that the operation of L-μCOM 2 has been completed. An advantage attained when a state data is used as an operation completion signal resides in that a change in lens state during operation can be detected.

Communication type in which B-μCOM 1 waits for the completion of L-μCOM 2 operation has been described. It is desired to forcedly terminate the operation in some modes such as "AFDRV", "LSCAN" and "PFDRV". Accordingly termination process for communication will b described by way of example of operation mode "PFDRV" shown in FIGS. 7 (E) and (F).

Referring now to FIG. 7 (E), there is shown a timing chart in which completion of operation is noticed from L-μCOM 2 in the operation mode "PFDRV". Completion of the operation mode "PFDRV" at the L-μCOM 2 side is caused by the fact that the AF switch is changed to the AF mode and that the rotary manipulation member has not been manipulated for a given period of time. At the time $t_{10}$, L-μCOM 2 sets the logical level of the signal line "MCONT" from HI to LO to inform B-μCOM 1 that transmission is possible. 14 byte data and 2 byte state data are transmitted to B-μCOM 1 in synchronization with the signal "LCONT". The 14 byte data is identical with the data which is transmitted in the operation mode "AEAFDATA" of L-μCOM 2. The reason why the 14 byte datais transmitted is as follows: That is, the operation mode "PFDRV" takes time until operation is completed depending upon the user's use condition so that data related to photometry and rangefinding can not be read out until the operation is completed. Therefore necessary data are transmitted as soon as the operation mode "PFDRV" has been completed.

Referring now to FIG. 7 (F), communication process when the operation mode "PFDRV" is stopped by the request of B-μCOM 1 will be described. Such a request of B-μCOM 1 is caused when the release switch is depressed to a second position, that is, fully depressed so that exposure sequence is desired to be performed immediately. At the time $t_{11}$ B-μCOM 1 sets the signal "LCONT" from HI to LO so that it requests to stop the operation mode "PFDRV". B-μCOM 1 is brought into a standby state to be able to always receive any data simultaneously with this request. When L-μCOM 2 detects the request, it stops the operation of the mode "PFDRV". L-μCOM 2 sets the signal "MCONT" from HI to LO at the time $t_{12}$ and transmits 14 byte+2 byte data to B-μCOM 1 as described above. After completion of the transmission, L-μCOM 2 returns to an inoperative state and will not operate until the next communication is requested. Communication process in operation modes "AFDRV" and "LSCAN" is identical with that in the operation mode "PFDRV" except that there is no 14 byte data in these modes.

Referring now to FIG. 7 (B), there is shown a timing chart showing operation modes "LAMPON" and "CPUID". No communication of state data representative of completion of operation is carried out in these operation modes. This is because there is no need to feed state data since the execution time period of these two modes is very short.

FIG. 7 (C) is a timing chart of the operation modes "LPULSE", "PLSSET", "ABSSET", "LAMPSET", and "AVSET". In these operation modes, B-μCOM 1 transmits necessary data as well as mode data to L-

μCOM 2 and operation is conducted by using these data.

FIG. 7 (D) is a timing chart of the operation modes "LTDATA" and "AEAFDATA". Necessary data are transmitted to B-μCOM 1 in these modes prior to communication of 2 byte state data representing the operation completion.

An embodiment formed in such a manner will be described with reference to a flow chart shown in FIGS. 8 through 11.

Figure 8:
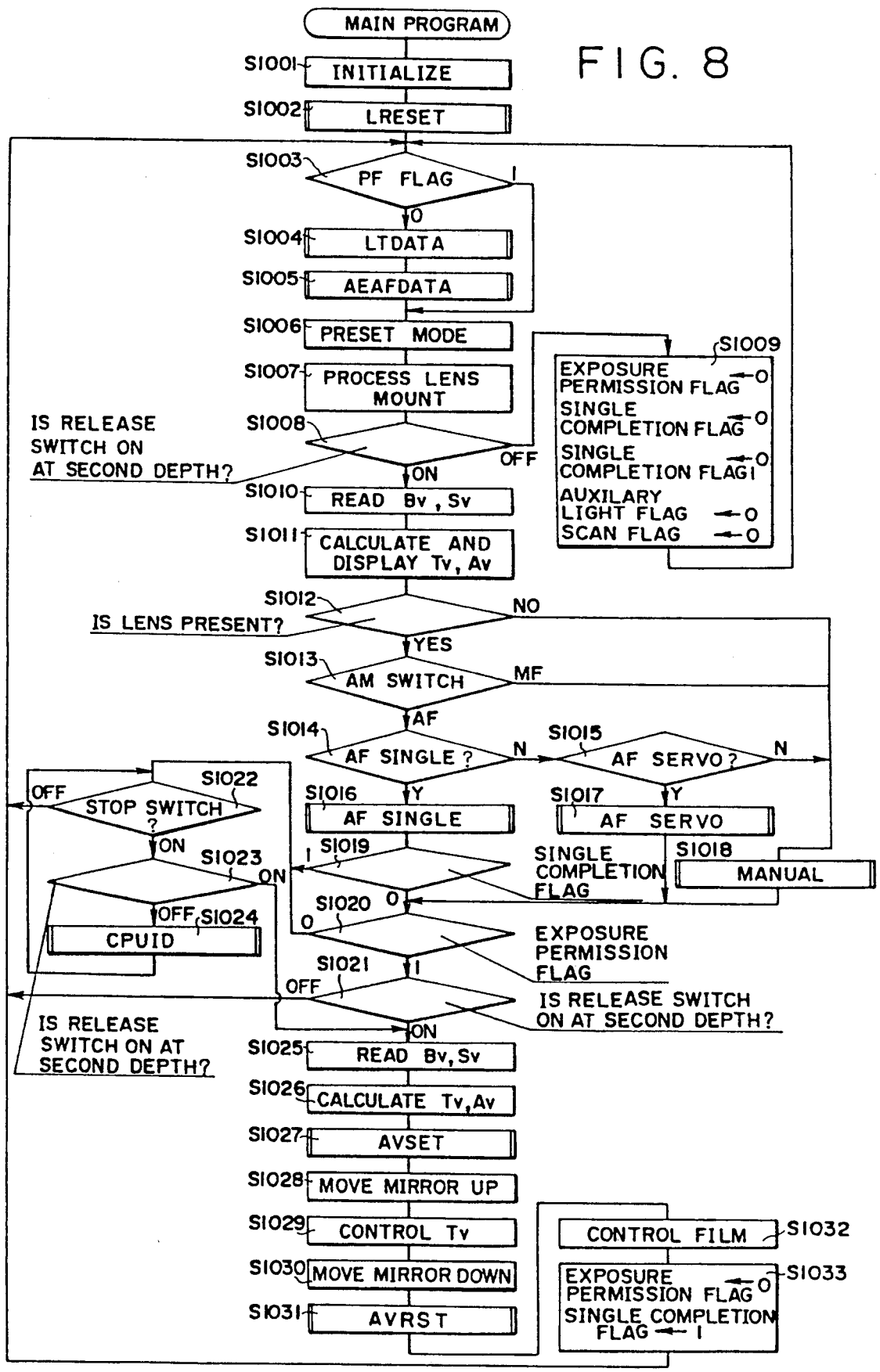

FIG. 8 is a flow chart showing a main routine of a program executed in B-μCOM 1. When a main switch is turned on, B-μCOM 1 is reset when the power is on. At step S1001, I/O ports and control flags and the like are initialized. At step S1002, communication for executing the operation mode "LRESET" of L-μCOM 2 is carried out. This operation causes the lense to be driven to the infinity end. At step S1003, determination whether a PF flag is present or not is carried out prior to execution at steps S1004 and S1005. The PF flag is set to 1 while the operation mode "PFDRV" of L-μCOM 2 is executed. If communication to L-μCOM 2 is attempted when the PF flag is set, operation of the mode "PFDRV" is broken since the communication begins with resetting L-μCOM 2. Accordingly, the program is branched to step S1006 when PF flag is set. When the PF flag is reset, that is, 0, communication to execute operation modes "LTDATA" and "AEAFDATA" (step S1004 and S1005) in L-μCOM 2 is carried out for inputting data from a lens. At step S1006, a state of a mode preset switch 16 (refer to FIG. 2) is inputted and simultaneously display of a mode executed by the display control circuit 15 (refer to FIG. 2) is carried out. At a step S1007, it is detected whether exchange of a lens has been conducted. If it is detected that a lens barrel is mounted, operation modes "LRESET" and "AVRST" of L-μCOM 2 are executed. At step S1008, it is determined whether the release switch 17 (refer to FIGS. 2 and 3) has been half depressed. If not depressed, the program is branched to a step S1009 to reset an exposure permission flag for controlling sequence and then returns to a step S1003. When the release switch 17 is depressed, the program proceeds to a step S1010 since sequence can be executed. At a step S1010, a Bv value of an object brightness and a Sv value are read from the photometric processing circuit 20 and the film sensitivity reading circuit 22 respectively. At a step S1011, a Tv value representing a shutter second time and an Av value representing an aperture value are calculated based upon the Bv value and Sv value which have been already read and data related to photometry inputted by the communication with L-μCOM 2 in order to comply with the exposure mode preset by the mode presetting switch 16. The calculated values are displayed in the viewfinder by means of the display control circuit 15. At step S1012, it is determined from the state of an LMSW terminal to be connected to mount contact 55 whether or not a lens barrel is mounted. When the lens barrel is not mounted, the program proceeds to a step S1018 to call a subroutine for manual mode. In the manual mode, in-focus or out-of-focus is displayed in a viewfinder based upon the focal point detection. At this time, the operation mode of L-μCOM 2 is preset to "PFDRV". Accordingly adjustment of a lens is carried out by a user who manipulates the rotary manipulation member. If the release switch has been fully depressed to a second depth, an exposure sequence can be executed irrespective of in-focus or out-of-focus. If the lens barrel is mounted, the program proceeds to a step S1013. At the step S1013, a state of the AM switch 32c (refer to FIG. 3) is determined. If the switch is in the MF mode, the program proceeds to a step S1018. If the switch is in the AF mode, the program proceeds to a step S1014. At steps S1014 and S1015, the program is branched to respective AF modes depending upon the state of the mode preset switch 16. In an AF single mode, lens driving is repeated based upon photometry and focus detection until the object is focussed. If focussed once, the focus detection will not be carried out until the release switch is released from the first depth depression and is depressed again. Execution of exposure sequence is permitted only once after focussing. In an AF servo mode, lens driving is permitted based upon photometry and focus detection while the release switch is half depressed to the first depth. If focussing is not possible due to the fact that an object moves after focussing once, lens driving is carried out based upon focus detection. Exposure sequence is operative at any time if focussed. After the program returns from the AF single mode subroutine of the step S1016, it is determined at the step S1019 whether a single completion flag is absent or present. Since this flag is set on completion of exposure operation, exposure operation can not be executed in the AF single mode when the flag is set. If the STOP switch 32b (refer to FIG. 3) is turned on, the state of the STOP switch 32b is checked at a step S1022 since exposure operation is possible. If the STOP switch is turned off, the program returns to the step S1003. If the STOP switch 32b is turned on, the program proceeds to a step S1023 to determine whether the release switch 17 is turned on at the second depth, that is, fully depressed. When the release switch is turned on at the second depth, the program proceeds to a step S1025 to execute an exposure sequence. If a release switch is turned off at the second depth, the program proceeds to a step S1024 to execute the operation mode "CPUID" of L-μCOM 2 to detect the state of a lens so that data on the state of the lens is obtained. Then the program returns to a step S1022 to determine the state of the STOP switch 32b again. In other words, the program is on standby in a state in which it may be shifted to exposure sequence whenever the stop switch is turned on by moving around a loop including steps S1022 through S1024. When a single completion flag is reset at a step S1019, the program is branched to a step S1020. When the program returns from "AF servo" mode of step S1017 and from "MANUAL" mode of step S1018, it jumps to a step S1020 since determination of "single completion flag" of step S1019 is not necessary. When "exposure permission flag" at a step S1020 is reset, execution exposure sequence is not permitted. The program is branched to a step S1022 since the exposure sequence is possible depending on the state of the STOP switch 32b. If "exposure permission flag" is set, the program proceeds to a step S1021. When the release switch 17 is turned off at the second depth, the program returns to a step S1003. When the switch 17 is turned on at the second depth, the program proceeds to a step S1025 to execute the exposure sequence. At the step S1025, a Bv value from the photometric processing circuit 20 (refer to FIG. 2) and a Sv value from the film sensitivity reading circuit 22 (refer to FIG. 2) are read. The program proceeds to a step S1026 where final Av and Tv values which will be used for exposure sequence are calculated. At a step S1027, the program causes L-μCOM 2 to execute an operation mode "AVSET" to preset the aperture to the final Av value. At steps S1025 through S1030, control of moving a quick return mirror (not shown) up/down and control of first and second screens of a shutter (not shown) responsive to the final Tv value is conducted by the shutter control circuit (refer to FIG. 2). At a step S1031, the program causes L-μCOM 2 to execute an operation mode "AVRST" for opening the aperture which has been closed at a step S1027. At a step S1032, film is wound up by one frame by the winding/rewinding control circuit (refer to FIG. 2). If exposure to one roll of film has been completed, the film is rewound. At step S1033, an "exposure permission flag" is reset. The program jumps to step S1003 after "single completion flag" has been set.

Figure 9A:
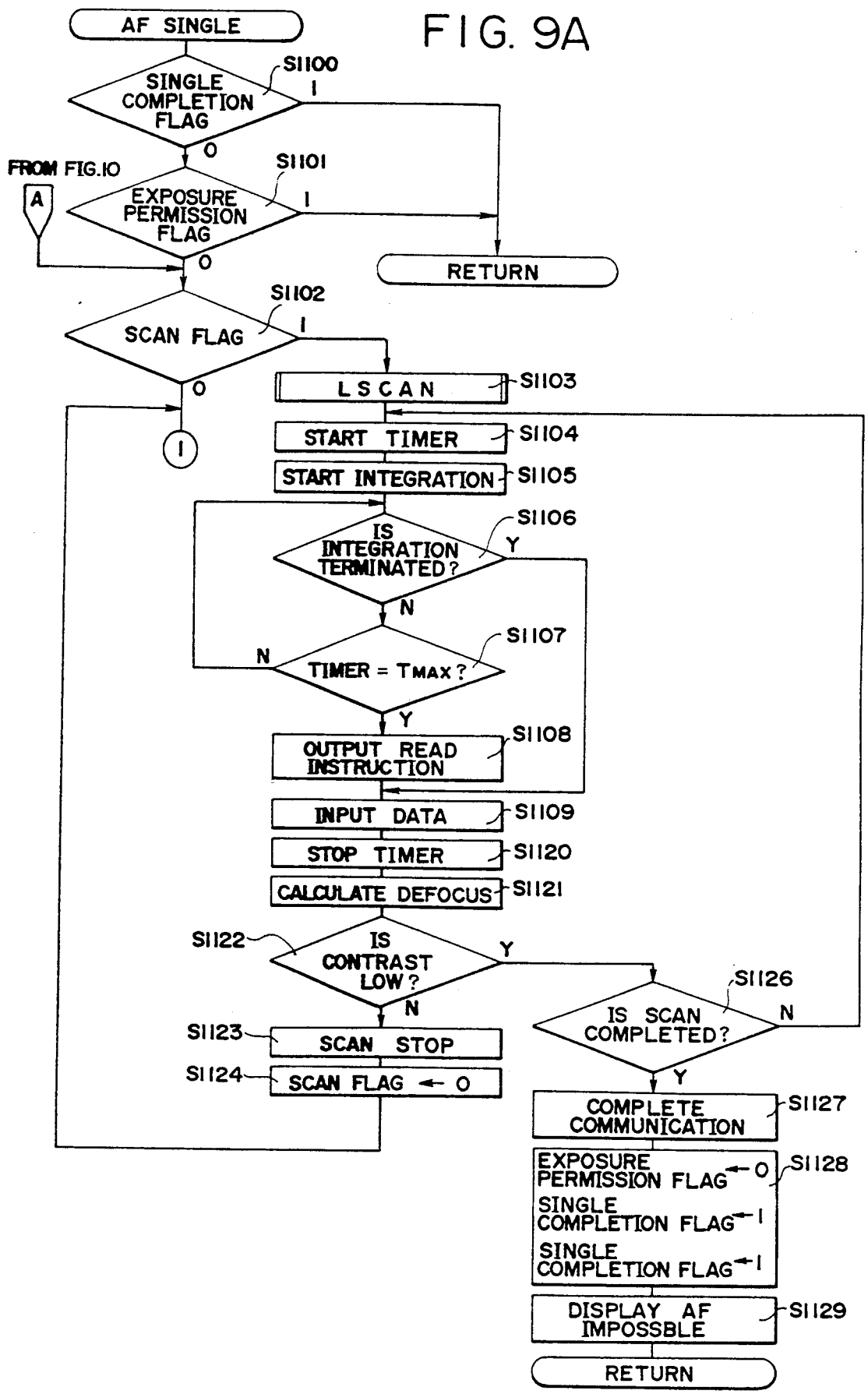
Figure 9B:
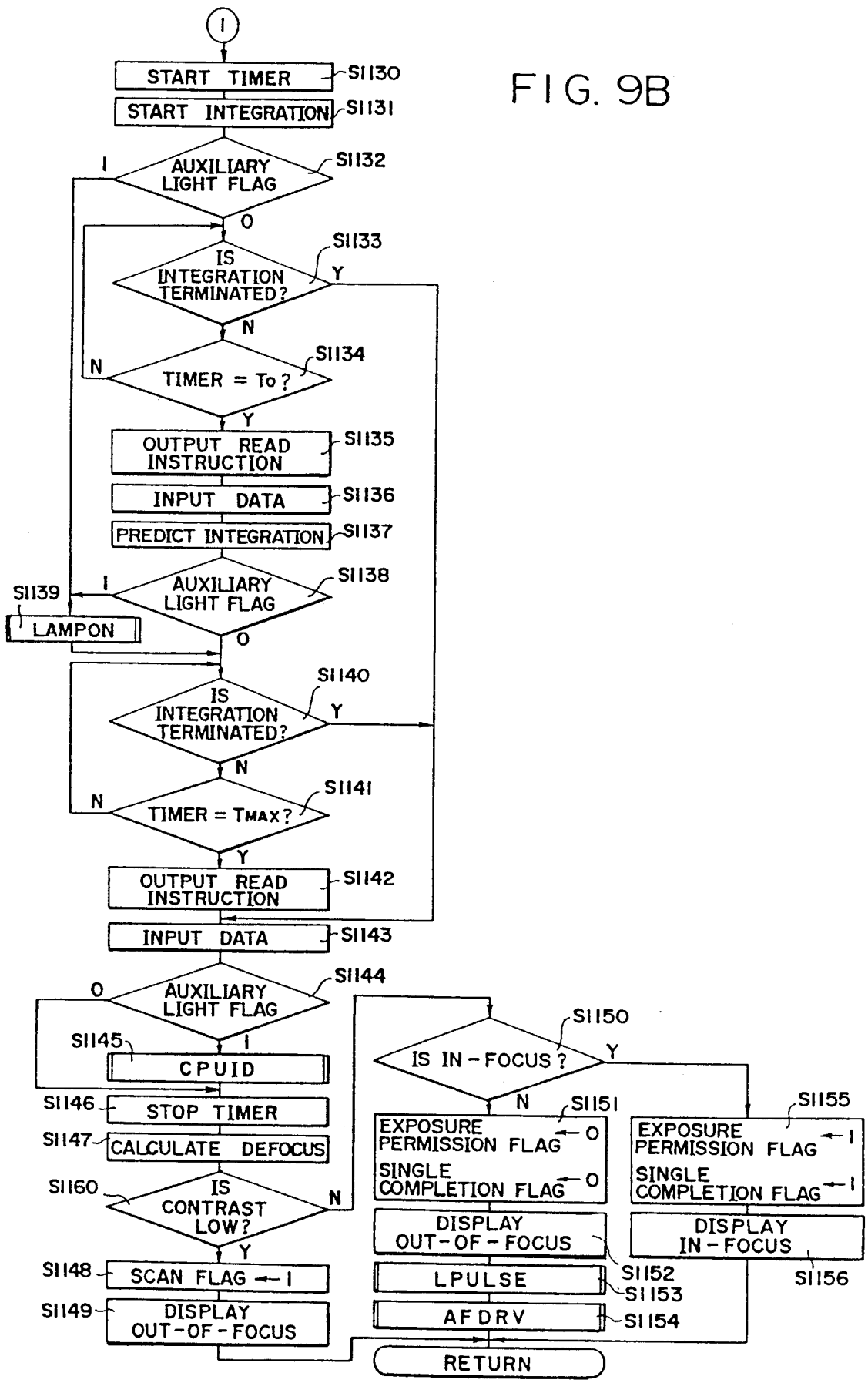

A subroutine "AF single" at a step S1014 in a flow of a main routine shown in FIG. 8 will be described with reference to the flow chart in FIG. 9. At steps S1100 and S1101, states of "single completion flag" and "exposure permission flag" are determined respectively. If any one of the states has been set, focus detection operation is prohibited and the program returns from the subroutine to main program shown in FIG. 8. "Single completion flag" is set when a camera operation from focussing to exposure sequence is executed or it has been determined that the focus detection is impossible. "Exposure permission flag" is set when focussing is conducted and execution of exposure sequence is permitted. At a step S1102, it is determined from the absence or presence of "scan flag" whether a lens scanning operation is necessary. When the "scan flag" is set, the program is branched to a step S1103 where a contrast of an object to be photographed is searched as shown in FIG. 9A. Since "scan flag" is set when the contrast of an object to be photographed is low, it is possible to set the scan flag after focus detection has been executed once. Accordingly, the program will not be branched to step S1103 unless the operation is the second and subsequent operation in this subroutine after starting AF single mode operation. At a step S1103, communication for executing the operation mode "LSCAN" of L-μCOM 2 is carried out. The lens is then driven from a current position via a proximate end to an infinity end. Simultaneously with start of the "LSCAN" operation, B-μCOM 1 repeats a focus detection operation to search an object contrast. At a step S1104, a timer is started to preset a maximum integration time of a line sensor 25 (refer to FIG. 2). At a step S1105, an instruction to start integration is outputted to the interface circuit (refer to FIG. 2). The interface circuit 26 then resets stored charges on SIPTs forming the sensor 25 to start the integration operation. At steps S1106 and S1107, an integration completion signal from the interface circuit 26 is waited for and it continues to monitor whether the timer reaches $T_{MAX}$ representative of a maximum integration time. If the timer reaches the maximum integration time $T_{MAX}$, the program proceeds to a step S1108 to output a read instruction to the interface circuit 26 so that the circuit 26 is forced to output data of the line sensor 25. The sensor data is inputted at a step S1109. If an integration completion signal is transmitted from the interface circuit 26 before the timer reaches the maximum integration time $T_{MAX}$, the program directly jumps to a step S1109 from a step S1106 to input the sensor data. After inputting data, the timer is stopped at a step S1120. At a step S1121, a defocus amount and a defocus direction is calculated from the input sensor data and simultaneously, the contrast of the object to be photographed is calculated. When the contrast is determined low at a step S1122, the program proceeds to a step S1123 to stop lens scan operation. When the scan operation is desired to stop, the logical level of the signal line "LCONT" is set from HI to LO. The scan flag is reset at a step S1124 and the program returns to a step S1130 (FIG. 9B) to execute a usual focus detection operation.

When the object is low contrast, the program is branched to a step S1126 where it determines whether a signal representative of completion of "LSCAN" has come from L-μCOM 2. If no signal of "LSCAN" completion has come, the program returns to the step S1104 to execute focus detection again. When the lens abuts on a stop at an infinity end or the STOP switch 32b is turned on, L-μCOM 2 stops the scan operation and sets the signal MCONT from HI to LO to request B-μCOM 1 to output a completion signal. At a step S1127 state data from L-μCOM 2 is inputted to terminate the completion communication. At a step S1128, the exposure permission flag is reset since the focus detection is impossible. The single completion flag is set since executing of the AF single mode may not be carried out. The signals completion flag 1 is used during the processing of the AF servo which will be described hereafter and is set when the focus detection operation in AF single mode is terminated. After display is made in the viewfinder that AF is impossible, the program returns from this subroutine. Returning to a step S1102, focus detection operation when no scan operation is performed will be described with reference to FIG. 9B. The timer to measure an integration time is started at a step S1130. An integration start instruction is outputted to the interface circuit 26 so that integration at the line sensor 25 is started at a step S1131. Presence or absence of "auxiliary light flag" is determined at a step S1132. The flag is set during "integration prediction" at a step S1137 which will be described hereafter. Since this flag is always reset when the release switch 17 is turned off, this flag is not set yet when AF single is initially called by the turn of the release switch 17 at the first depth. Accordingly, the program is not branched to a step S1139 by the first integration. The reason why the auxiliary light flag is determined is that the auxiliary light is desired to be lit from the beginning by stopping the processing of the integration prediction at the second and subsequent integrations if lighting of the auxiliary light is determined necessary once. This enables shortening of the integration time since a period of time required for integration prediction may be used as an effective integration time. When the auxiliary light flag is reset, an integral termination signal from the interface circuit 26 is waited for and it continues to monitor whether the timer reaches at $T_0$ Since the integration termination signal is fed when the object brightness is high enough, the program is branched to a step S1143 to input data. When the timer reaches $T_0$, the program is branched to steps S1135 and S1136 to read data of the SIPTs in the course of integration without breaking the data. At a step S1137, a predicted integration time $T_1$ is calculated and "auxiliary light flag" is set for lighting the auxiliary light when $T_1 > T_{MAX}$. If $D_{MAX}$ is assumed to be a maximum value of the sensor data which are inputted at an integration time $T_0$, the aforementioned predicted integration time $T_1$ may be calculated by the following formula:

$$T_1 = T_0 \times \frac{255}{D_{MAX}}$$

A maximum integration time $T_{MAX}$ is defined by taking into consideration a maximum integration time for which SIPT involves no practical problem and a maximum integration time which is allowed in camera sequence. At a step S1138, presence and absence of "auxiliary light flag" is determined. When the flag is set, the program is branched to a step S1139 for lighting an auxiliary light. Then, communication for causing L-μCOM 2 to execute the operation mode "LAMPON" is carried out. When the auxiliary light flag is reset, an integration termination signal from the interface circuit 26 is waited for and it continues to monitor whether the timer reaches a maximum integration time $T_{MAX}$ When the integration termination signal is fed, the program is branched to a step S1143 to input data. When the timer reaches a maximum integration time $T_{MAX}$, the program is branched to a step S1142 where data is forcedly read out to terminate integration. When the auxiliary light flag is set at a step S1144, the program is branched to a step S1144 to turn off the auxiliary light. Communication to cause L-μCOM 2 to execute the operation mode "CPUID" is then carried out. The timer for measuring the integration time is stopped at a step S1146. A defocus amount, defocus direction and an object contrast are calculated at a step S1147. When the contrast is determined low at a step S1160, the program is branched to a step S1148 where the scan flag is set since lens scan operation is necessary the next focus detection. Then out-of-focus is displayed in the viewfinder at a step S1149 and the program returns to the main routine. When there is some contrast, the program is branched to a step S1150, where determination whether the camera is in-focus or not is carried out by determining whether the obtained defocus amount falls in a circle of least confusion having $$\frac{FNo}{30} \text{ [mm]}.$$

When the defocus amount is smaller than the circle of least confusion, in-focus is determined and the program is branched to a step S1155, where the exposure permission flag and the single completion flag 1 are set. After display of in-focus is made at a step S1156, the program returns. When in-focus is not determined, the program proceeds to a step S1151 to reset the exposure permission flag and single completion flag 1. At a step S1152 out-of-focus is displayed. At a step S1153, communication to execute the operation mode "LPULSE" is carried to cause L-μCOM 2 to compute an amount of movement of a lens from the defocus amount. At a step S1154, L-μCOM 2 is caused to execute the operation mode "AFDRV" for driving the lens based upon the computed amount of movement.

A subroutine of "AF servo" at the step S1017 of a flow chart in the main routine shown in FIG. 8 will be described with reference to a flow chart shown in FIG. 10. At a step S1201, the presence or absence of the single completion flag 1 is determined. When the single completion flag 1 has been reset, the program is branched to a step S1102 of a subroutine of "AF single" shown in FIG. 9. The same operation as that of AF single is performed until in-focus or AF impossible is determined once. The reason why such a processing is necessary is because lighting of the auxiliary light or lens scanning operation is repeated many times depending upon the condition of an object to be photographed, an giving uncomfortable feeling to users if "AF servo" operation is performed by the repetition of "AF single" operation. When the single completion flag 1 has been set, a focus detection operation without lighting of the auxiliary light and lens scanning is performed at steps S1202 through S1209. Since operation of the steps S1202 through S1209 is identical with that of the steps S1104 through S1121, its description will be omitted. When contrast is determined low at a step S1210, the exposure permission flag is reset at a step S1214 and AF impossible is displayed at a step S1215. Thereafter the program returns. When it is determined that the contrast is not low, in-focus or out-of-focus is determined at a step S1211. If in-focus, the program proceeds to a step S1212 where the exposure flag is set and then goes to a step S1213 where in-focus is displayed. Thereafter the program returns. If out-of-focus, the program is branched to steps S1216 through S1219 to set the exposure permission flag and out-of-focus is displayed. The program then causes L-μCOM 2 to drive the lens in accordance with a defocus amount and returns.

Figure 11:
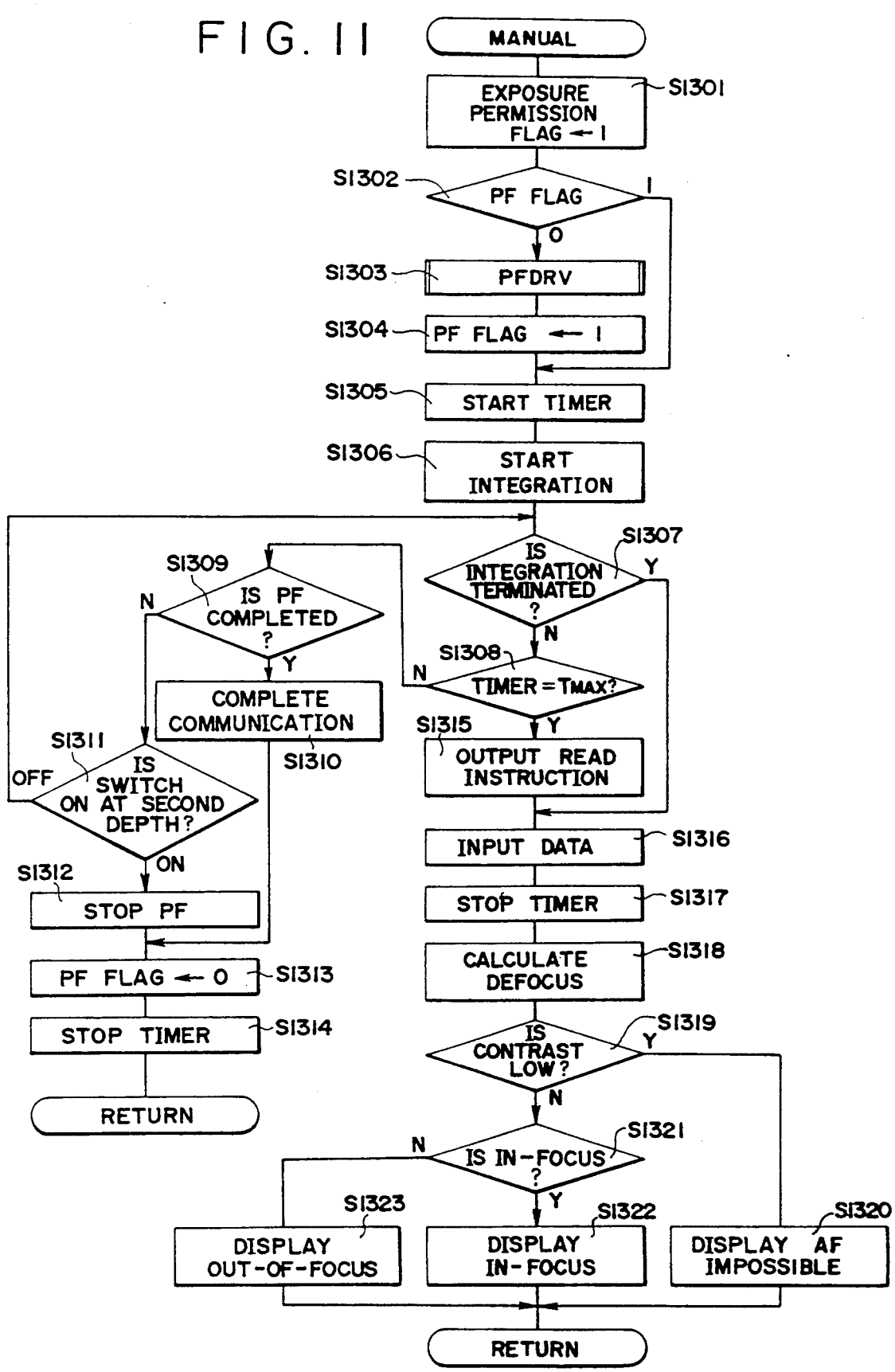

Operation of a subroutine "Manual" at a step S1018 of a flow chart in the main routine shown in FIG. 8 will be described with reference to a flow chart shown in FIG. 11. The exposure permission flag is set at a step S1301. The reason why the exposure permission flag is set irrespective of in-focus or out-of-focus in such a manner is because whether or not exposure sequence is executed in a manual mode is determined only by user's intention independently of the result of focus detection. Accordingly the result of focus detection is used for only display. Presence or absence of the PF flag is determined at a step S1302. Since communication for executing the operation mode "PFDRV" has been already carried out to L-μCOM 2 when the PF flag is set, the program is branched to a step S1305. When the PF flag is reset, the program proceeds to a step S1303 where "PFDRV" is executed and at a step S1304 the PF flag is set. After the program proceeds to a step S1305 where a timer is started, it proceeds to a step S1306 where an integration at the sensor is started. While integration at the sensor is carried out, the presence or absence of the integration termination signal is determined at a step S1307 and determination of whether or not a timer reaches at the maximum integration time $T_{MAX}$ is made at a step S1308 and the presence or absence of the PF completion signal is determined at a step S1309 and the state of the release switch at the second depth is monitored at a step S1311. When the signal "MCONT" is changed from HI to LO and L-μCOM requests a completion communication at a step S1309, the programmed is branched to a step S1310, where 14+2 byte data are inputted from L-μCOM 2 as mentioned above. After the PF flag is cleared at a step S1313 and the timer is stopped at a step S1314, the program returns. When it is detected that the release switch is turned on at the second depth at a step S1311, the signal "LCONT" is set from HI to LO and step of the operation mode "PFDRV" is requested to L-μCOM 2 at a step S1312. Then 14+2 byte data are then inputted. At a step S1313, the PF flag is reset and at a step S1314 the timer is stopped. When the integration is terminated due to the fact that an integration termination signal is generated at a step S1307 or the timer reaches $T_{MAX}$ at a step S1308, the data of respective sensors are inputted so that a defocus amount, a defocus direction and a contrast value are calculated based upon the inputted data at steps S1315 through S1318. The result of AF is displayed based upon the contrast value and the defocus amount.

Figure 12:
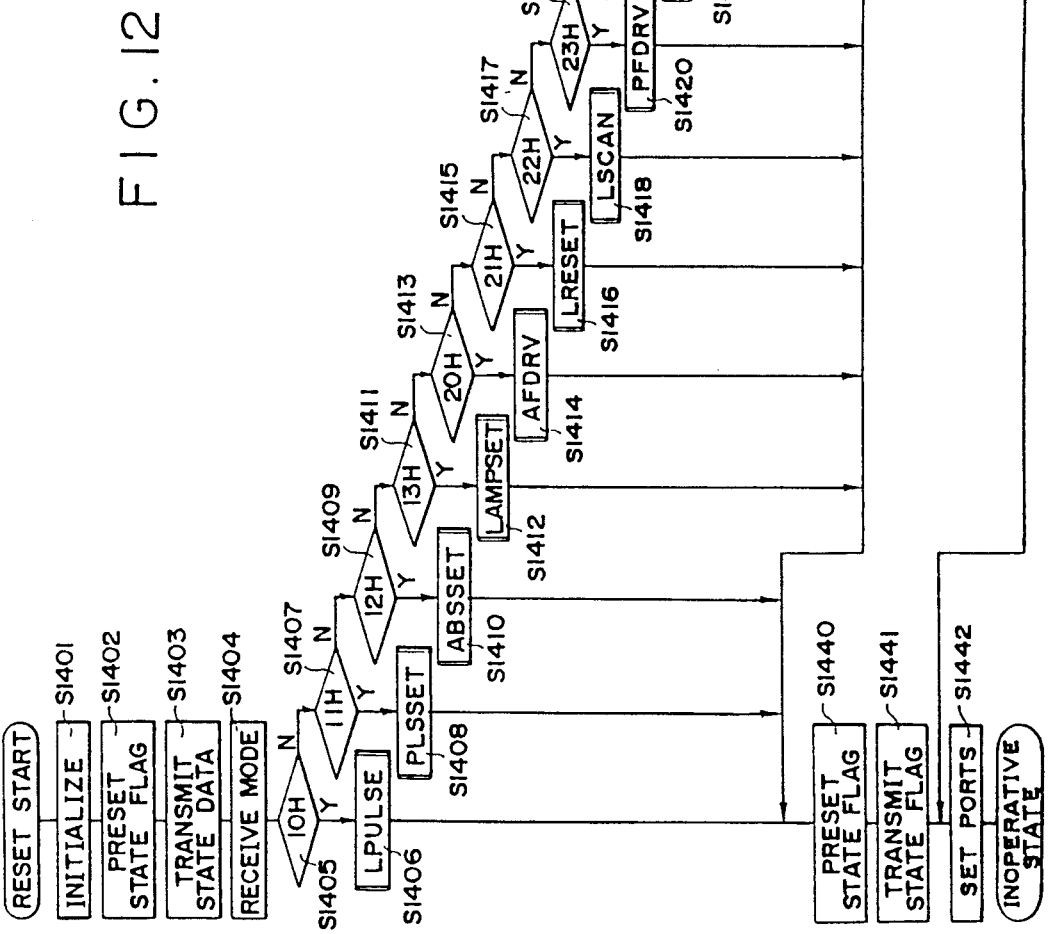
FIG. 12 is a flow chart showing the operation executed in the microprocessor in the accessory.

FIG. 12 is a flow chart for explaining the operation of L-μCOM 2. In the drawing, B-μCOM 2 which is normally in an inoperative state is activated from an inoperative state to an operative state in response to a reset pulse of signal LRST outputted from B-μCOM 1 prior to communication. At a step S1401, initialization of I/O ports, interrupt ports, and timers, etc. is conducted. At a step S1402, necessary information is collected from memories for preparing 2 byte state data which are fed to B-μCOM 1 as mentioned above. At a step S1403, state data are transmitted to B-μCOM 1 in accordance with the afore-mentioned timing chart of FIG. 7 communication between B-μCOM 1 and L-μCOM 2 is carried out based upon handshake of a signal MCONT with a signal LCONT. If an abnormal condition occurs in handshake, L-μCOM 2 is brought into an inoperative state and never operated. If L-μCOM 2 receives a code data representative of an operation mode from B-μCOM 1, it sends a code data the same as the received code data back to B-μCOM 1 for checking whether or not abnormality occurs on communication between B-μCOM 1 and L-μCOM 2 at a step S1404. B-μCOM 1 then compares both data to check the presence of abnormal communication. If there is abnormality in code data, B-μCOM 1 resets L-μCOM 2 to stop current communication as mentioned above. L-μCOM 2 begins processing again from the beginning. However L-μCOM 2 is rendered inoperative so that it stops operation since it is unable to handshake with B-μCOM 1 on communication. If there is no abnormality in communication, the program is branched to one of the subroutines of representative modes at steps S1405 through S1433 in accordance with code data. If L-μCOM 2 receives an unidentified code, it is rendered inoperative after setting an abnormal flag at a step S1433. Since operation modes "LAMPON" and "CPUID" at the steps S1426 and S1432 do not involve a completion communication, L-μCOM 2 will be brought into an idle state to terminate its operation after executed representative modes and having preset input/output ports at a step S1442 so that abnormality will not occur in the circuit in the inoperative state. Since the operation modes "AFDRV", "LSCAN" and "PFDRV" at steps S1414, S1418 and S1420 should stop the operation and execute a completion communication if B-μCOM 1 requests to do so as mentioned above, L-μCOM 2 monitors the state of a signal "LCONT" and simultaneously executes operation. After execution of modes other than "LAMPON" and "CPUID", the program branches to steps S1440 and S1441 where L-μCOM 2 conducts a completion communication with B-μCOM 1 by a processing the same as those at steps S1402 and S1403. After conducting communication L-μCOM 2 is brought into an inoperative state and terminates its operation.

Although having described the present invention by way of an embodiment in which a lens barrel is removably mounted upon a camera body, it is apparent that the present invention is not limited to this embodiment, and is applicable to any camera accessory such as an electronic flash unit, remote control unit and function back. Although an example of serial synchronization communication system has been described, the present invention is applicable to any communication system. It is apparent that the present invention is applicable to a camera body having a plurality of microcomputers therein if the relation between main and subsidiary microcomputers is established similarly to the present embodiment. A microcomputer is reset in order to recover from a stop state. This recovery is similarly possible by using a wake-up function peculiar to CPU (for example, interruption). In this case initialization of counters and the like should be conducted at the beginning.

What is claimed is:

1. A camera system including a camera having a camera body and a camera accessory which may be mounted on the camera body to execute predetermined operations in accordance with instructions from the camera body when the accessory is mounted on the camera body, comprising:
   accessory operating means associated with said accessory normally maintained in a standby condition;
   means associated with said camera for outputting a control signal to the accessory for bringing the accessory into an operative state prior to a predetermined camera operation;
   said accessory operating means being responsive to the control signal for activating the camera accessory from an inoperative state to an operative state;
   means associated with said camera for providing a signal to instruct an operation mode to the accessory from the camera body after the accessory has been activated into an operative state;
   means associated with said accessory for executing an operation mode in the accessory in accordance with the operation mode instructing signal; and
   means for returning the accessory from an operative state to an inoperative state after the execution of the operation mode.

2. A camera system as defined in claim 1 in which after the camera accessory has been activated in response to the control signal, the accessory includes means to transmit a signal representative of the stat of the accessory to the camera.

3. A camera system as defined in claim 1 in which the camera accessory means for executing the operation mode transmits the operation mode signal back to the camera body responsive to receipt of the operation mode signal; and said camera further including means responsive to the operation mode signal transmitted to the camera body from the accessory for terminating the operation mode when the operation mode signal transmitted to the camera body from the accessory is not identical with the operation mode signal initially transmitted from the camera body to the accessory.

4. A camera system as defined in claim 1 in which the accessory further includes means to transmit a signal representative of the completion of the operation to the camera body responsive to the completion of the operation mode by the operation mode executing means.

5. A camera system as defined in claim 4 wherein said means for providing an operation mode signal comprises means for providing a second operation mode signal for controlling a second operation; and means for preventing generation of a second operation mode signal unless an operation completion signal is received from said accessory.

6. A camera system as defined in claim 2 wherein said operation mode instruction signal providing means transmits said operation mode signal to the accessory responsive to said state signal.

7. A control device in a camera accessory which may be mounted on the camera body and executes predetermined operations in accordance with instructions form the camera body, including a control signal for activating the accessory and for selecting a particular operating mode, comprising:
- means for activating the accessory into an operative state from a normally inoperative state in response to said control signal;
- means for selecting one of a plurality of operation modes which function independently of each other in accordance with the control signal;
- means for executing the selected operation mode; and
- means for causing the accessory to be switched to standby in said inoperative state after the execution of the operation mode.

8. A control device in the accessory as defined in claim 7 in which said activating means transmits a signal representative of the state of the accessory after it receives the control signal from the camera body.

9. A control device in a camera accessory as defined in claim 7 in which the mode selecting means includes means for transmitting the selected operation mode signal back to the camera body after the completion of the control instruction and means for resetting he accessory to an inoperative state from the operative state if the operation mode transmitted to the accessory is not identical with the operation mode which is transmitted back to the camera body.

10. A control device in a camera accessory, as defined in claim 7 in which means are provided for generating a signal representative of the completion of the operation, which signal is transmitted to the camera body responsive to completion of the operation mode by the operation mode executing means.

11. A control device in a camera accessory as defined in claim 10 further including means to prevent the camera body from proceeding to a next step until said preventing means receives an operation completion signal.

12. A control device in a camera body on which a camera accessory having a microcomputer may be mounted and which executes predetermined camera operations in cooperation with the camera accessory, comprising:
- said camera body microcomputer including means for providing to the camera accessory a control signal;
- said accessory microcomputer, which is normally in an inoperative state, being changed to an operative state responsive to said control signal prior to the execution of the predetermined camera operation; and
- said camera body microcomputer further including means for providing a signal to instruct an operation mode to the camera accessory microcomputer.

13. A control device in a camera body as defined in claim 12 12 in which the operation mode instructing signal providing means includes means to provide an operation mode signal responsive to receipt of a signal representative of the state of the accessory which is generated from means in the camera accessory in response to the control signal provided to the accessory.

14. A control device in a camera body as defined in claim 12 in which the operation mode instructing signal providing means includes means to stop the communication between the camera body and the accessory when the operation mode signal which is received form the accessory is not identical with the operation mode signal transmitted to the accessory.

15. A control device in a camera as defined in claim 12 wherein, after the operation mode has been instructed from the operation mode instructing signal providing means, the camera body includes means to prevent further operation of said operation mode instructing signal providing means until receipt of an operation completion signal inputted to the camera body from the accessory.

16. A camera system, comprising:
- a camera body having a power source for supplying electric power to camera components, manual manipulation means for presetting camera modes and shutter release and the like, control means for conducting shutter control and film winding and rewinding and the like and a microcomputer for controlling the control means in accordance with the instructions from the manipulation means;
- a taking lens barrel having driving means for focussing at least a taking lens and a microcomputer which normally is in an inoperative state to reduce unnecessary power consumption; and
- connecting means including contact means which connects the power supply in the camera body with the lens barrel and a contact means through which the microcomputer in the camera body communicates with the microcomputer in the lens barrel, whereby a start signal is transmitted form the microcomputer in the camera body to the microcomputer in the lens barrel through the connecting means prior to a camera operation whereby the microcomputer in the lens barrel is activated into an operative state responsive to said start signal.

17. A camera system as defined in claim 16 in which the microcomputer in the camera body transmits and operation mode signal to the microcomputer in the lens barrel after the microcomputer in the lens barrel has been activated by the reception of the reset signal.

18. A camera system as defined in claim 17 in which the microcomputer in the lens barrel is brought into an inoperative state to reduce the power consumed after it has completed the execution of the operation mode instructed form the microcomputer in the camera body.

19. A camera system including a camera body and a camera accessory means which may be mounted upon the camera body to perform a predetermined function, comprising:
- means in said camera body for outputting to the accessory means signal to activate the accessory means prior to camera operation;
- means in said accessory means responsive to the activating signal for activating the accessory means form an inoperative state to an operative state to execute predetermined operation modes; and
- means for altering the accessory means from an operative state to an inoperative state after the completion of each operation mode.

20. A camera system, comprising:
- a camera body having manual manipulation means for presetting camera modes and shutter release and the like, control means for conducting shutter control and film winding and rewinding and the like and a microcomputer for controlling the control means in accordance with the instructions for the manipulation means;

a taking lens barrel having driving means for focussing at least a taking lens and a normally disabled microcomputer for executing a plurality of subprogram instructions stored therein, each including a single function, for controlling the driving means; and connecting means through which the microcomputers in the camera body and the lens barrel communicate with each other, whereby the microcomputer int eh camera body selects one of a plurality of single functions in accordance with a program instruction stored therein responsive tot the manipulation means and transmits a function selection signal to the microcomputer in the lens barrel causing the microcomputer in the lens barrel to be converted to the active sate whereby it executes a single function in accordance with the selection signal.

21. A camera system as defined in claim 20 in which after the execution of the single function, the microcomputer in the lens barrel includes means to transmit an operation completion signal to the microcomputer in the camera body and thereafter stop the operation of the microcomputer in the lens barrel.

22. A camera system as defined in claim 21 wherein the lens barrel microcomputer is stopped in a standby state which consumes less power than that required in the operating state.

23. A camera system as defined in claim 21 in which program instruction means provided in the microcomputer of the camera body includes said plurality of subprogram selections, said microcomputer in the camera body selecting a subprogram instruction after the operation of the lens barrel microcomputer has been completed, and transmitting the selected instruction to the microcomputer in the lens barrel through the connecting means.

24. A camera system including a camera having a camera body and a camera accessory which may be mounted on the camera body, comprising:

a microcomputer in the camera body in which a program instruction for controlling and driving the camera is stored;

a microcomputer int eh accessory which is normally in a standby state and in which a program instruction including a plurality of signal functions is stored, said accessory microcomputer being activated and said program being executed responsive to the instruction from the program stored in the microcomputer int eh camera body; and connecting means through which the microcomputers in the accessory and the camera body communicate with each other when the accessory is properly mounted on the camera body.

25. A method of controlling a camera accessory which may be mounted on a camera body and executes predetermined camera operations in accordance with instructions from the camera body, said method comprising the steps of:

(a) sending an instruction to the accessory;
(b) changing the accessory from an initial inoperative stat to an operative state responsive to the instruction from the camera body;
(c) providing a plurality of operating modes for operating the accessory;
(d) selecting one of said plurality of operating modes which function independently of each other according to the camera function to be performed;
(e) operating the accessory according to the selected operation mode; and
(f) returning the accessory to an inoperative state after execution of step (d).

26. A method of controlling a camera accessory as defined in claim 25 in which step (a) further includes the step of transmitting a signal representative of the state of the accessory to the camera body after the accessory has changed its state.

27. A method of controlling a camera accessory as defined in claim 25 in which step (d) further includes the step of determining whether or not a signal representative of the completion of the execution of the operation mode is to be transmitted depending upon the operation mode.

28. A method of controlling a camera accessory as defined in claim 27 in which the step of sending a completion signal includes sending a signal representative of the state of the accessory.

29. A method of controlling a camera accessory as defined in claim 28 in which the signal representative of the accessory state is changed by the execution of the operation mode.

30. A camera system including a camera having a camera body and a normally disabled accessory for mounting on said camera body, said system comprising:

manipulation means for initiating the operation of certain camera functions;

first means responsive to operation of said manipulation means for transmitting an enabling signal to said accessory;

second means in said accessory for turning on the normally disabled accessory;

third means responsive to turn on of said accessory for transmitting a state signal to said camera;

fourth means responsive to said state signal for transmitting an instruction command to said accessory;

fifth means responsive to said instruction command for causing an operation of said accessory according to the instruction command; and sixth means responsive to completion of said accessory operation for transmitting a completion signal to said camera body.

31. The apparatus of claim 30 further comprising seventh means responsive to said completion signal for generating another instruction command for causing a different operation of said accessory.

32. The apparatus of claim 30 wherein said fourth means further includes means for comparing the enabling signal with the state signal to prevent said fourth means for generating an instruction command in the event that said enabling signal and said instruction command are not identical.

33. The apparatus of claim 30 further comprising seventh means responsive to said completion signal for returning the accessory to the disabled state.

34. A method for operating a camera system comprising a camera having a camera body and an accessory capable of being releasably mounted upon said camera body, said camera including manual manipulation means for operating said camera and said accessory including means for performing a plurality of different functions in cooperation with said camera means, said method comprising the steps of:

activating the accessory, which is normally maintained in the inactive state, responsive to operation of the manipulation means;

transmitting a signal to the camera body upon changeover to said active state;

selecting one of a plurality of instruction codes stored in the camera body responsive to sad state signal according to the operation of the manipulation means;

transmitting the selected instruction code to the accessory;

causing said accessory to perform a predetermined function associated with the received instruction code; and returning the accessory to the inactive state upon completion of performance of said function.

35. The method of claim 34 further comprising the steps of:

transmitting a completion signal to the camera body;

selecting another instruction code from the plurality of instruction codes stored in said camera body responsive to receipt of the completion signal;

transmitting the last selected instruction code to the accessory; and performing another function of said accessory according to the instruction code received.

36. The method of claim 35 wherein the functions performed by the accessory include at least one of the functions taken from the group consisting of focussing a taking lens, adjusting the zoom lens, determining the distance between an object to be photographed and the camera and measuring scene brightness.

* * * * *

UNITED STATES PATENT AND TRADEMARK OFFICE
CERTIFICATE OF CORRECTION

PATENT NO. : 5,060,005  Page 1 of 2
DATED : October 22, 1991
INVENTOR(S) : Itoh et al.

It is certified that error appears in the above-identified patent and that said Letters Patent is hereby corrected as shown below:

Column 2, line 55, change ""aVSET"" to --"AVSET"--

Column 6, line 53, change "represntative" to --representative--

Column 7, line 32, change "10 PFDRV:" to --PFDRV:--

Column 10, line 12, change "b" to --be--

Column 10, line 28, change "datais" to --data is--

Column 11, line 17, change "lense" to --lens--

Column 14, line 25, change "signals" to --single--

Column 14, line 56, delete "at"

Column 14, line 56, after "$T_0$" insert --.--

Column 15, line 32, after "necessary" insert --at--

Column 16, line 4, change "an giving" to --giving an--

Column 16, lines 54-55, change "L-μCOM" to --L-μCOM 2--

Column 16, line 56, change "programmed" to --program--

Column 18, line 44, change "stat" to --state--

Column 19, line 7, change "form" to --from--

Column 19, line 61, change "claim 12 12" to --claim 12--

UNITED STATES PATENT AND TRADEMARK OFFICE
CERTIFICATE OF CORRECTION

PATENT NO. : 5,060,005
DATED : October 22, 1991
INVENTOR(S) : Itoh et al.

It is certified that error appears in the above-identified patent and that said Letters Patent is hereby corrected as shown below:

```
Column 20, line 3, change "form" to --from--

Column 20, line 32, change "form" to --from--

Column 20, line 48, change "form" to --from--

Column 21, line 1, change "for" to --from--

Column 21, line 47, change "int eh" to --in the--

Column 21, line 53, change "int eh" to --in the--

Column 21, line 65, change "stat" to --state--

Column 23, line 7, change "sad" to --said--
```

Signed and Sealed this

Fourth Day of May, 1993

Attest:

MICHAEL K. KIRK

*Attesting Officer*   *Acting Commissioner of Patents and Trademarks*